US012743048B2

(12) United States Patent
Takahashi et al.

(10) Patent No.: US 12,743,048 B2
(45) Date of Patent: Sep. 22, 2026

(54) IMAGE FORMING APPARATUS

(71) Applicant: CANON KABUSHIKI KAISHA, Tokyo (JP)

(72) Inventors: Yukihiro Takahashi, Kanagawa (JP); Takuya Hayato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/091,598

(22) Filed: Mar. 26, 2025

(65) Prior Publication Data

US 2025/0306525 A1 Oct. 2, 2025

(30) Foreign Application Priority Data

Mar. 29, 2024 (JP) ................................ 2024-055650

(51) Int. Cl.
*G03G 21/16* (2006.01)
*G03G 15/01* (2006.01)
*G03G 15/08* (2006.01)

(52) U.S. Cl.
CPC ..... *G03G 21/1647* (2013.01); *G03G 15/0121* (2013.01); *G03G 15/0808* (2013.01); *G03G 15/0865* (2013.01); *G03G 2221/1633* (2013.01)

(58) Field of Classification Search
CPC ........... G03G 15/0173; G03G 21/1647; G03G 21/1676; G03G 15/0121; G03G 15/0875
See application file for complete search history.

(56) References Cited

U.S. PATENT DOCUMENTS

| | | | | | |
|---|---|---|---|---|---|
| 5,258,819 | A * | 11/1993 | Kimura | G03G 15/0126 | 399/119 |
| 5,809,370 | A * | 9/1998 | Ueno | G03G 15/0126 | 399/119 |
| 2010/0080627 | A1 * | 4/2010 | Takamura | G03G 21/1647 | 399/167 |
| 2011/0142488 | A1 * | 6/2011 | Yamashita | G03G 21/1633 | 399/119 |

FOREIGN PATENT DOCUMENTS

| | | | |
|---|---|---|---|
| JP | H10239942 | A | 9/1998 |
| JP | 2005121873 | A | 5/2005 |
| JP | 2007183305 | A | 7/2007 |
| JP | 2016157139 | A | 9/2016 |

* cited by examiner

*Primary Examiner* — Jessica L Eley
(74) *Attorney, Agent, or Firm* — Canon U.S.A., Inc. IP Division

(57) ABSTRACT

An image forming apparatus configured such that a cartridge that stores a developer is attachable to and detachable from the image forming apparatus includes a rotary that is rotatable and that is configured to store the developer supplied from the cartridge; a tray that removably supports the cartridge and that moves with respect to the rotary to a retraction position in which the cartridge is located outside the rotary and to a mount position in which the cartridge is located inside the rotary; and a control unit that controls the movement of the tray. In a case that an elapsed time since the tray is located at the retraction position exceeds a predetermined length, the control unit controls the movement of the tray such that the tray moves from the retraction position to the mount position.

13 Claims, 18 Drawing Sheets

IMAGE FORMING APPARATUS

BACKGROUND

Technical Field

The present disclosure relates to an image forming apparatus using a rotary developing system and relates, in particular, to toner-cartridge replacement control.

Description of the Related Art

There is a known rotary developing system in which a rotary including a plurality of development rollers is rotated to form a color image in an electrophotographic image forming apparatus. Japanese Patent Laid-Open No. 2007-183305 and Japanese Patent Laid-Open No. 2007-183305 each describe an image forming apparatus that includes a rotary including a plurality of development rollers, and a plurality of toner cartridges (toner containers) attachable to and detachable from the rotary.

SUMMARY

The present disclosure provides an image forming apparatus in a new form in which technologies in the related art have been developed.

One aspect of the present disclosure is as follows.

An image forming apparatus configured such that a cartridge that stores a developer is attachable to and detachable from the image forming apparatus, the image forming apparatus including:

- a rotary that is rotatable and that is configured to store the developer supplied from the cartridge;
- a tray that removably supports the cartridge and that moves with respect to the rotary to a retraction position in which the cartridge is located outside the rotary and to a mount position in which the cartridge is located inside the rotary; and
- a control unit that controls a movement of the tray,
- in which, in a case that an elapsed time since the tray is located at the retraction position exceeds a predetermined length of time, the control unit controls the movement of the tray such that the tray moves from the retraction position to the mount position.

Further features of the present disclosure will become apparent from the following description of exemplary embodiments with reference to the attached drawings.

DESCRIPTION OF THE EMBODIMENTS

First Embodiment

Figure 1:
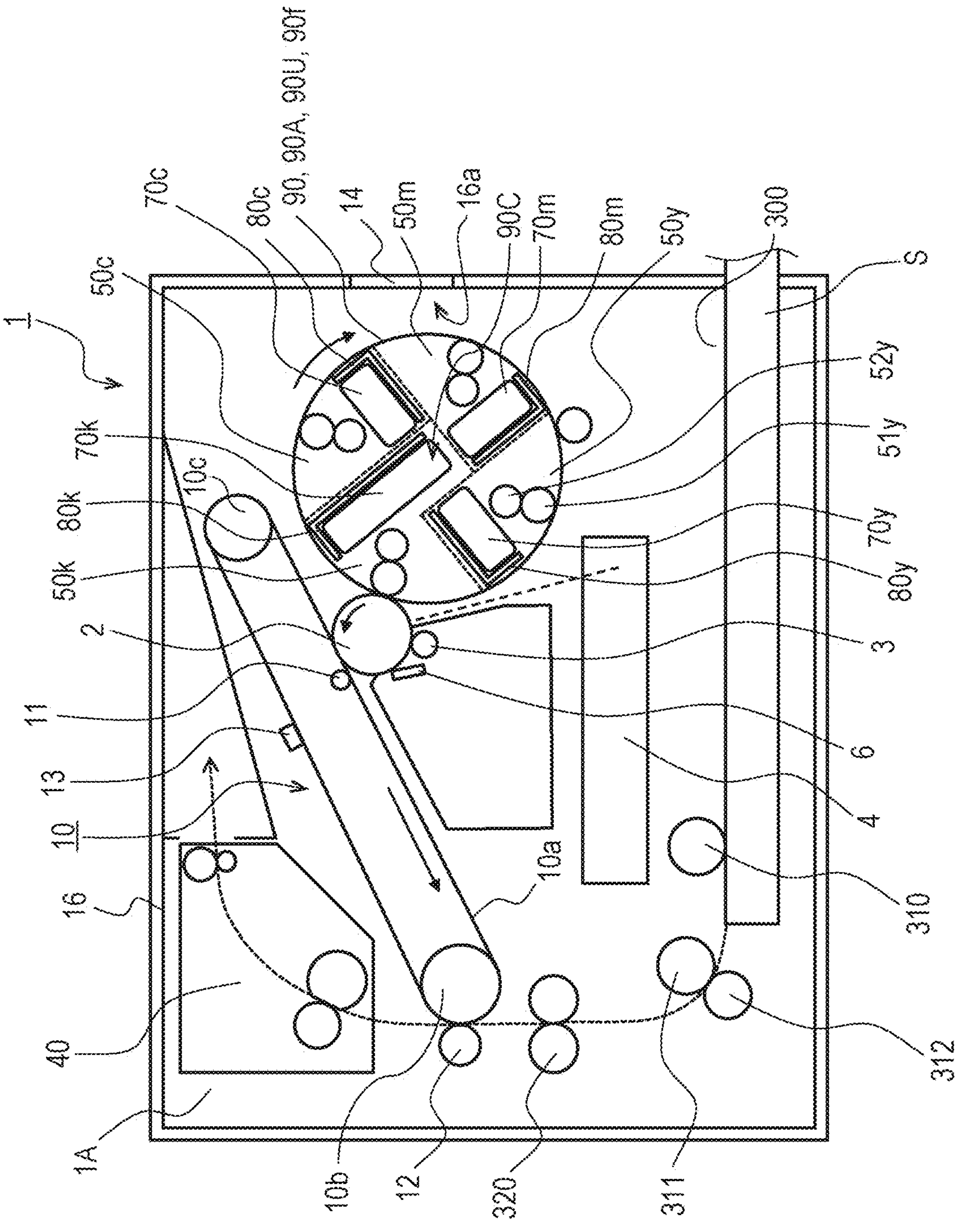
FIG. 1 is a schematic view of an image forming apparatus according to a first embodiment.

With reference to FIG. 1 to FIG. 16, an image forming apparatus 1 according to a first embodiment will be described. In the following description and the drawings, a vertical direction with the image forming apparatus 1 set on a horizontal plane is referred to as a Z-direction. A direction that intersects the Z-direction and that is a direction (rotational axis direction of a rotary) along a rotational axis 90C of a rotary body 90 (described later) is referred to as a Y-direction. A direction that intersects both the Z-direction and the Y-direction is referred to as an X-direction. The X-direction and the Y-direction can be each a horizontal direction. In addition, the X-direction, the Y-direction, and the Z-direction can be orthogonal to each other. As necessary, the directions of the arrows X, Y, and Z illustrated in the drawings are referred to as the +X side, the +Y side, and the +Z side, respectively, and the opposite sides thereof are referred to as the −X side, the −Y side, and the −Z side, respectively.

Overall Configuration of Image Forming Apparatus

First, an overall configuration of the image forming apparatus 1 will be described. The image forming apparatus 1 is a laser beam printer that forms an image onto a sheet S by an electrophotographic system. Specifically, the image forming apparatus 1 is a color laser beam printer that includes four developing units 50*y*, 50*m*, 50*c*, and 50*k*. As the sheet S that is a recording material (recording medium), it is possible to use various sheet materials, which are different in size and/or material, including paper such as plain paper and cardboard, plastic films, fabrics, surface-treated sheet materials such as coated paper, specifically shaped sheet materials such as envelopes and index paper, and the like.

Figure 2:
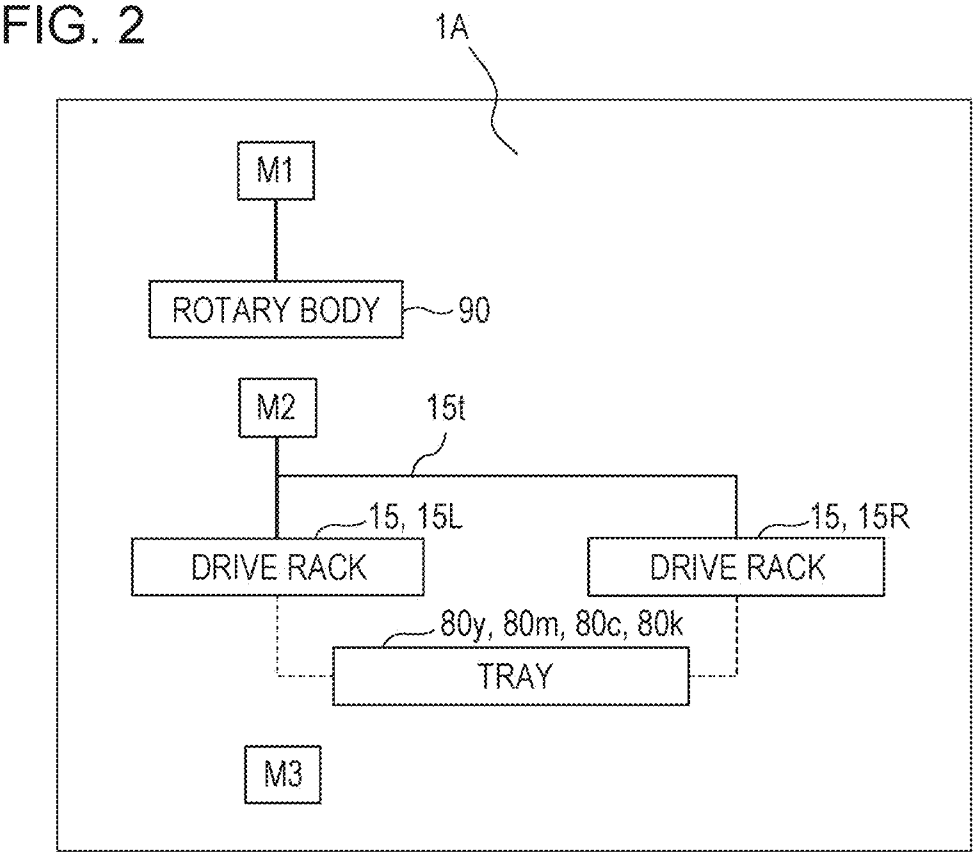
FIG. 2 is a configuration diagram of the image forming apparatus according to the first embodiment.
Figure 3:
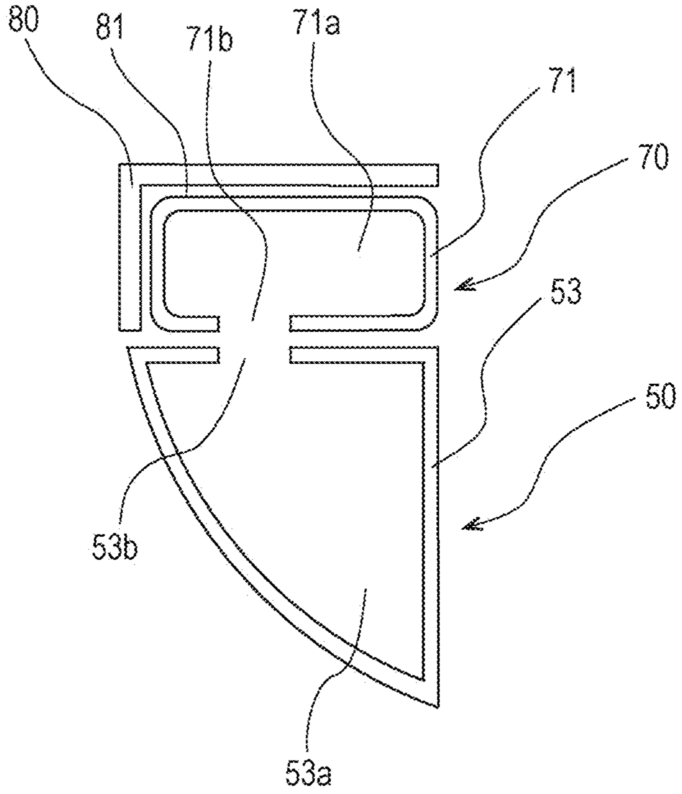
FIG. 3 is a schematic view of a developing unit, a toner cartridge, and a tray according to the first embodiment.

With reference to FIG. 1, FIG. 2, and FIG. 3, a general configuration of the image forming apparatus 1 and an image forming operation will be described. FIG. 1 is a schematic view illustrating a sectional configuration of the image forming apparatus 1. FIG. 2 illustrates a driving source of the image forming apparatus 1. FIG. 3 is a conceptual diagram illustrating a configuration for replenishing a developing unit 50 with a toner from a toner cartridge 70.

As illustrated in FIG. 1, the image forming apparatus 1 includes an image forming apparatus body (hereinafter, the apparatus body) 1A and toner cartridges 70*y*, 70*m*, 70*c*, and 70*k* attachable to and detachable from the apparatus body 1A. The apparatus body 1A in the present embodiment is a part of the image forming apparatus 1 from which the toner cartridges 70*y*, 70*m*, 70*c*, and 70*k* are excluded.

The apparatus body 1A of the image forming apparatus 1 includes a drum-shaped (cylindrical) electrophotographic photosensitive member (hereinafter, photosensitive drum) 2 as an image carrier that carries an electrostatic latent image. A charging roller 3, a scanner 4 as an exposure device, and a cleaning unit 6 are disposed around the photosensitive drum 2.

The charging roller 3 is an example of a charging unit configured to electrically charge the photosensitive drum 2 uniformly. The scanner 4 is an example of an exposure unit configured to irradiate the photosensitive drum 2 with laser light corresponding to image information and exposure the photosensitive drum 2 with the laser light. As a result of the charged photosensitive drum 2 being irradiated with laser light, an electrostatic latent image is formed on a surface of the photosensitive drum 2. The cleaning unit 6 is an example of a cleaner configured to remove a toner remaining on the surface of the photosensitive drum 2.

The apparatus body 1A further includes a sheet storage portion 300, a pickup roller 310, a feed roller 311, a separation roller 312, a transport roller pair 320, a second transfer roller 12, a fixing device 40, and an intermediate transfer unit 10. The pickup roller 310 is an example of a feeder configured to feed the sheet S. The feed roller 311 and the separation roller 312 are examples of a separation transport unit configured to transport sheets S while separating each sheet S from the other sheets S by a frictional force. The second transfer roller 12 is an example of a transfer unit configured to transfer an image onto the sheet S from an intermediate transfer belt 10*a*.

The intermediate transfer unit 10 includes the intermediate transfer belt 10*a*, a belt drive roller 10*b*, a tension roller 10*c*, a cleaning device 13, and a first transfer roller 11. The intermediate transfer belt 10*a* is an example of an intermediate transfer body configured to carry an image that is transferred (first transfer) from the photosensitive drum 2 and transports the image to transfer (second transfer) the image onto the sheet S. The intermediate transfer belt 10*a* is stretched around the belt drive roller 10*b* and the tension roller 10*c*. The belt drive roller 10*b* is a driving member configured to transport the intermediate transfer belt 10*a* by being driven to rotate by a driving source.

The apparatus body 1A also includes the rotary body (rotary or rotor) 90 that includes the developing units 50*y*, 50*m*, 50*c*, and 50*k*. As described later, trays 80*y*, 80*m*, 80*c*, and 80*k* are attached to the rotary body 90 in the present embodiment. The toner cartridges 70*y*, 70*m*, 70*c*, and 70*k* are removably mounted on the trays 80*y*, 80*m*, 80*c*, and 80*k*, respectively. The toner cartridge 70*k* is an example of a first toner cartridge. The toner cartridge 70*m* is an example of a second toner cartridge. The toner cartridge 70*y* is an example of a third toner cartridge. The toner cartridge 70*c* is an example of a fourth toner cartridge.

The tray 80*k* is an example of a first support member that supports the first toner cartridge. The tray 80*m* is an example of a second support member that supports the second toner cartridge. The tray 80*y* is an example of a third support member that supports the third toner cartridge. The tray 80*c* is an example of a fourth support member that supports the fourth toner cartridge.

The developing units 50*y*, 50*m*, 50*c*, and 50*k* are examples of a developing unit configured to develop (visualize) an electrostatic latent image formed on the photosensitive drum 2 into a toner image by using a toner of a color corresponding to the electrostatic latent image. The developing units 50*y*, 50*m*, 50*c*, and 50*k* develop an electrostatic latent image formed on the photosensitive drum 2 by using a yellow toner, a magenta toner, a cyan toner, and a black toner, respectively.

The developing unit 50*y* includes a development roller 51*y*, a supply roller 52*y*, and a development blade. The development roller 51*y* is a developer carrier that rotates while carrying a toner as a developer and supplies the toner to the photosensitive drum 2. The supply roller 52*y* is a supply member that is disposed in contact with the development roller 51*y* and supplies a toner to the development roller 51*y*. The development blade is a regulation member that regulates the thickness of a toner layer carried by the development roller 51*y*. The other developing units 50*m*, 50*c*, and 50*k* also include similar development roller 51*m*, 51*c*, and 51*k* and supply roller 52*m*, 52*c*, and 52*k*, respectively and each include a development blade.

The toner cartridges 70*y*, 70*m*, 70*c*, and 70*k* corresponding to the developing units 50*y*, 50*m*, 50*c*, and 50*k*, respectively, are mounted on the rotary body 90. As toners with which the developing units 50*y*, 50*m*, 50*c*, and 50*k* are replenished, the yellow toner, the magenta toner, the cyan toner, and the black toner are stored inside the toner cartridges 70*y*, 70*m*, 70*c*, and 70*k*, respectively. The black toner is an example of a first toner, and the magenta toner is an example of a second toner.

Here, the rotary body 90 includes a rotary frame body 90*f* that supports the developing units 50*y*, 50*m*, 50*c*, and 50*k*. The developing units 50*y*, 50*m*, 50*c*, and 50*k* are supported by the rotary frame body 90*f* that is a rotatable rotary support body.

The trays 80*y*, 80*m*, 80*c*, and 80*k* are attached to the rotary body 90. A combination of the rotary body 90 and the trays 80*y*, 80*m*, 80*c*, and 80*k* can be referred to as a rotary unit 90U. In other words, the rotary unit 90U includes the rotary body 90 and the trays 80*y*, 80*m*, 80*c*, and 80*k*.

The toner cartridges 70*y* to 70*k* are detachably held by the trays 80*y* to 80*k* respectively. The trays 80*y* to 80*k* are, as described later, supported to be movable by sliding to the outside of the rotary body 90. A combination of the rotary unit 90U and the toner cartridges 70*y*, 70*m*, 70*c*, and 70*k* can be referred to as a rotary assembly 90A. In other words, the rotary assembly 90A includes the rotary unit 90U and the toner cartridges 70*y*, 70*m*, 70*c*, and 70*k*.

As described later, the rotary body 90 is rotatable about the rotational axis (rotation center) 90C. The rotational axis 90C coincides with the rotational axis of each of the rotary frame body 90*f*, the rotary unit 90U, and the rotary assembly 90A. The rotational axis 90C is substantially parallel to the rotational axis (rotation center) of the photosensitive drum 2.

By rotating about the rotational axis 90C, the rotary body 90 can be in a development orientation in which any one of the development rollers 51*y*, 51*m*, 51*c*, and 51*k* faces the photosensitive drum 2. An orientation in which the development roller 51*y* faces the photosensitive drum 2 is referred to as a yellow development orientation. An orientation in which the development roller 51*m* faces the photosensitive drum 2 is referred to as a magenta development orientation. An orientation in which the development roller 51*c* faces the photosensitive drum 2 is referred to as a cyan development orientation. An orientation in which the development roller 51*k* faces the photosensitive drum 2 is referred to as a black development orientation. That is, the rotary body 90 can rotate about the rotational axis 90C such that the position of each of the development rollers 51*y*, 51*m*, 51*c*, and 51*k* relative to the photosensitive drum 2 changes. The black development orientation is an example of a first development orientation in which a first development roller (development roller 51*k*) faces the photosensitive drum 2. The other development orientations are examples of a second development orientation in which a second development roller (development rollers 51*y* to 51*c*) faces the photosensitive drum 2.

As illustrated in FIG. 2, the apparatus body 1A includes motors M1, M2, and M3 as driving sources. As described later, the motor M1 supplies a driving force for rotating the rotary body 90 about the rotational axis 90C. In other words, the motor M1 rotates the rotary assembly 90A and the rotary unit 90U about the rotational axis 90C.

The apparatus body 1A also includes a driving device 98 that includes the motor M2 and a transmission device. The transmission device includes drive racks 15L and 15R, as later-described drive gears, and a transmission portion 15*t*. The driving force of the motor M2 is transmitted to the drive racks 15L and 15R by the transmission portion 15*t*. In other words, the motor M2 is configured to drive the drive racks 15L and 15R and moves the trays 80*y*, 80*m*, 80*c*, and 80*k* with respect to the rotary body 90 via the drive racks 15L and 15R. That is, the motor M2 drives each tray 80.

The motor M3 drives members other than the members that are driven by the motor M1 or the motor M2. For example, the motor M3 drives the photosensitive drum 2, the developing units 50*y*, 50*m*, 50*c*, and 50*k*, the pickup roller 310, the feed roller 311, the transport roller pair 320, the second transfer roller 12, the belt drive roller 10*b*, and the fixing device 40.

The members that are driven by the motor M1, M2, and M3 can be changed, as appropriate. In addition, functions of any two or all of the three motors M1, M2, and M3 can be consolidated in one motor. Meanwhile, a driving source other than the motors M1, M2, and M3 may be added.

Here, the suffixes y, m, c, and k attached to the developing units 50*y*, 50*m*, 50*c*, and 50*k*, the toner cartridges 70*y*, 70*m*, 70*c*, and 70*k*, the trays 80*y*, 80*m*, 80*c*, and 80*k* and the like represent colors of toners. Basic configurations and functions of the developing units 50*y*, 50*m*, 50*c*, and 50*k* are the same. Basic configurations and functions of the toner cartridges 70*y*, 70*m*, 70*c*, and 70*k* are the same. In addition, basic configurations and functions of the trays 80*y*, 80*m*, 80*c*, and 80*k* are the same. Therefore, the suffixes y, m, c, and k are omitted and any one of the four units, any one of the four cartridges, and any one of the four trays will be described when distinguishment of them is not required.

As illustrated in FIG. 3, the toner cartridge 70 includes a toner frame body 71. The toner frame body 71 has a toner storage portion 71*a* that stores a toner and a discharge opening 71*b* in communication with the toner storage portion 71*a*.

The developing unit 50 includes a development frame body (storage frame body) 53. The development frame body 53 has a development-side storage portion 53*a* and a reception opening 53*b* in communication with the development-side storage portion (toner supply chamber) 53*a*. As described above, the developing unit 50 includes the development roller 51, the supply roller 52, and the like. These members are, however, omitted in FIG. 3.

The development roller 51*k* of the developing unit 50*k* is an example of the first development roller. The development roller 51*m* of the developing unit 50*m* is an example of the second development roller. A development frame body 53*k* (FIG. 4A) of the developing unit 50*k* having the development-side storage portion 53*a* is an example of a first storage frame body having a first storage portion. A development frame body 53*m* (FIG. 4A) of the developing unit 50*m* having the development-side storage portion 53*a* is an example of a second storage frame body having a second storage portion. The rotary body 90 is an example of a rotatable rotary that includes the first development roller, the second development roller, the first storage frame body having the first storage portion, and the second storage frame body having the second storage portion. In the present embodiment, the rotary body 90 includes first to fourth development rollers and first to fourth storage frame bodies.

As described later, the toner cartridge 70 is movable with respect to the development frame body 53 to a mount position and to a retraction position retracted from the mount position. In a state in which the toner cartridge 70 is located at the mount position with respect to the development frame body 53, the discharge opening 71*b* faces the reception opening 53*b*. That is, the toner storage portion 71*a* of the toner cartridge 70 and the development-side storage portion 53*a* of the developing unit 50 are in communication with each other through the discharge opening 71*b* and the reception opening 53*b*. During replenishing of the developing unit 50 with a toner from the toner cartridge 70, at least a portion of the reception opening 53*b* is located below at least a portion of the discharge opening 71*b*.

Then, a toner stored in the toner storage portion 71*a* is discharged through the discharge opening 71*b*, and the toner discharged through the discharge opening 71*b* is stored in the development-side storage portion 53*a* through the reception opening 53*b*. That is, the rotary body 90 is configured to store a developer supplied from the toner cartridge 70. The toner stored in the toner storage portion 71*a* is supplied to the development roller 51 through the above route.

The toner cartridge 70 can include a sealing member (first sealing member), which is not illustrated, covering the discharge opening 71*b*. In addition, the developing unit 50 can include a sealing member (second sealing member), which is not illustrated, covering the reception opening 53*b*.

In a state in which the toner cartridge 70 is not mounted on the developing unit 50, the discharge opening 71*b* and the reception opening 53*b* can be each covered by the sealing member to suppress flowing-out of the toner through the discharge opening 71*b* and the reception opening 53*b*.

Image Forming Operation

An image forming operation in the present embodiment will be described. First, the photosensitive drum 2 is rotated in the arrow direction (counterclockwise) in FIG. 1 in synchronization with the rotation of the intermediate transfer belt 10*a*. Then, a surface of the photosensitive drum 2 is electrically charged by the charging roller 3 uniformly.

In formation of a color image onto the sheet S, the rotary body 90 rotates as described below in the arrow direction (clockwise) in FIG. 1 while supporting the developing units 50*y*, 50*m*, 50*c*, and 50*l*. Then, an electrophotographic process is repeated while the development rollers 51$y$, 51$m$, 51$c$, and 51$k$ are moved one by one to a development position.

First, the scanner 4 irradiates the photosensitive drum 2 with laser light based on image data corresponding to a yellow image and forms an electrostatic latent image corresponding to the yellow image onto a surface of the photosensitive drum 2. In parallel with formation of this electrostatic latent image, the motor M1 rotates the rotary body 90 to cause the rotary body 90 to be in the yellow development orientation. While the rotary body 90 is in the yellow development orientation, the development roller 51$y$ is located at the development position and develops, with the yellow toner, the electrostatic latent image formed on the photosensitive drum 2.

Here, in the present embodiment, each of the development rollers 51$y$, 51$m$, 51$c$, and 51$k$ is an elastic roller including a metal shaft covered with rubber. At the development position, each of the development rollers 51$y$, 51$m$, 51$c$, and 51$k$ develops, in a state of being in contact with the photosensitive drum 2, an electrostatic latent image. That is, a contact developing method is employed in the image forming apparatus 1 in the present embodiment. However, at the development position, each of the development rollers 51$y$, 51$m$, 51$c$, and 51$k$ may develop an electrostatic latent image in a state in which a gap is present between the photosensitive drum 2 and each of the development rollers 51$y$, 51$m$, 51$c$, and 51$k$. That is, a contactless developing method may be employed in the image forming apparatus 1.

When the yellow toner image is developed, the yellow toner image on the photosensitive drum 2 is first-transferred onto the intermediate transfer belt 10$a$ by the first transfer roller 11 disposed on the inner side of the intermediate transfer belt 10$a$.

Thereafter, toner images of each of the colors are formed by moving the development rollers 51$m$, 51$c$ and 51$k$ sequentially to the development position by rotating the rotary body 90. That is, after the yellow toner image is formed on the intermediate transfer belt 10$a$, the rotary body 90 is caused to be in the magenta development orientation, and a magenta toner image is formed on the intermediate transfer belt 10$a$. After the magenta toner image is formed on the intermediate transfer belt 10$a$, the rotary body 90 is caused to be in the cyan development orientation, and a cyan toner image is formed on the intermediate transfer belt 10$a$. After the cyan toner image is formed on the intermediate transfer belt 10$a$, the rotary body 90 is caused to be in the black development orientation, and a black toner image is formed on the intermediate transfer belt 10$a$.

Then, a color image is formed on the intermediate transfer belt 10$a$ as a result of first transfer being repeated such that the toner images of the four colors are superposed on each other on the intermediate transfer belt 10$a$. The second transfer roller 12 and the cleaning device 13 are not in contact with the intermediate transfer belt 10$a$ until the color image is formed on the intermediate transfer belt 10$a$.

Meanwhile, the sheet S is fed by the pickup roller 310 from the sheet storage portion 300 provided at a lower portion of the apparatus body 1A. In a state of being separated from the other sheets S by the feed roller 311 and the separation roller 312, each sheet S is sent to the transport roller pair 320. The transport roller pair 320 sends each of the fed sheets S to a transfer part (second transfer part) that is a nip part between the intermediate transfer belt 10$a$ and the second transfer roller 12. The color image on the intermediate transfer belt 10$a$ is transferred (second transfer) onto a surface of the transported sheet S.

The sheet S on which the color image has been transferred is sent to the fixing device 40. At the fixing device 40, the sheet S is heated and pressurized, and the image is fixed to the sheet S. The sheet S that has passed through the fixing device 40 is discharged as a product to the outside of the image forming apparatus 1.

In formation of a monochrome image onto the sheet S, the rotary body 90 is in the black development orientation. In this state, after an electrostatic latent image is formed on the surface of the photosensitive drum 2 as a result of the photosensitive drum 2 being electrically charged and being exposed with light, the development roller 51$k$ located at the development position develops the electrostatic latent image with a black toner. The black toner image is first-transferred onto the intermediate transfer belt 10$a$ and then second-transferred onto the sheet S. Steps thereafter are the same as those for color images.

Configuration of Rotary

With reference to FIG. 1, FIGS. 4A and 4B, and FIG. 5, a configuration of the rotary body 90 will be described.

Figure 4A:
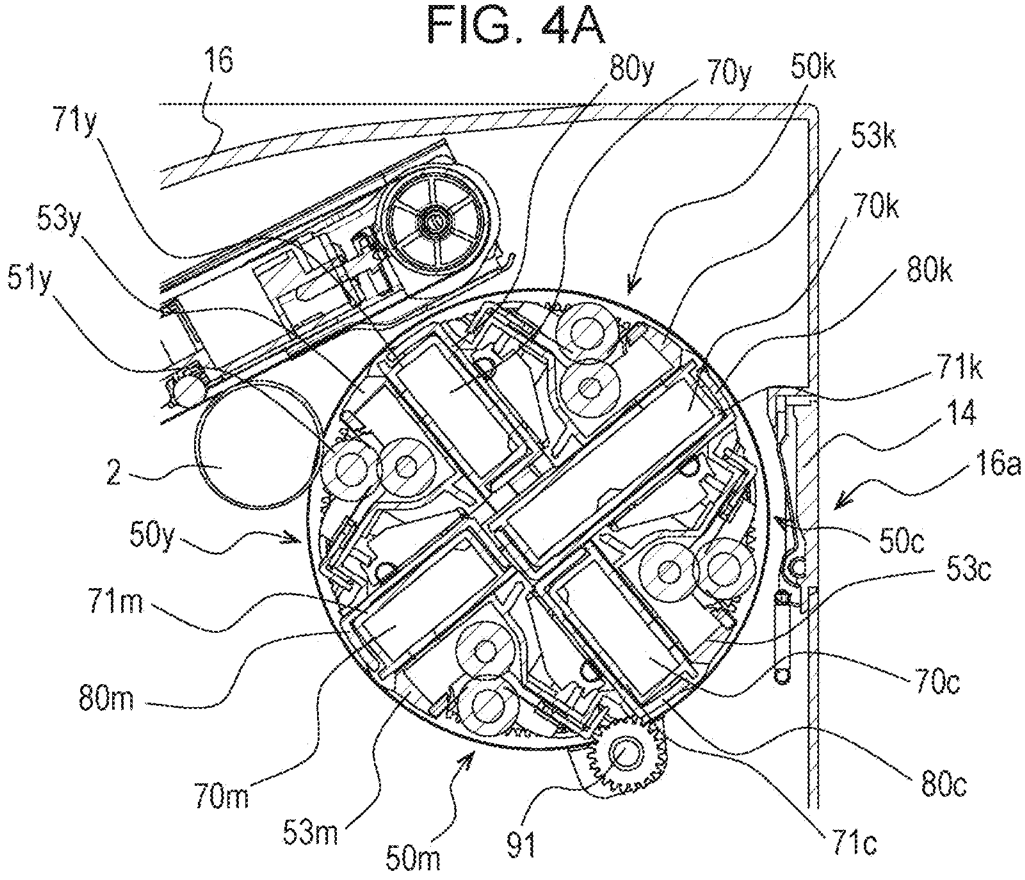
FIGS. 4A and 4B are sectional views of the image forming apparatus according to the first embodiment.
Figure 4B:
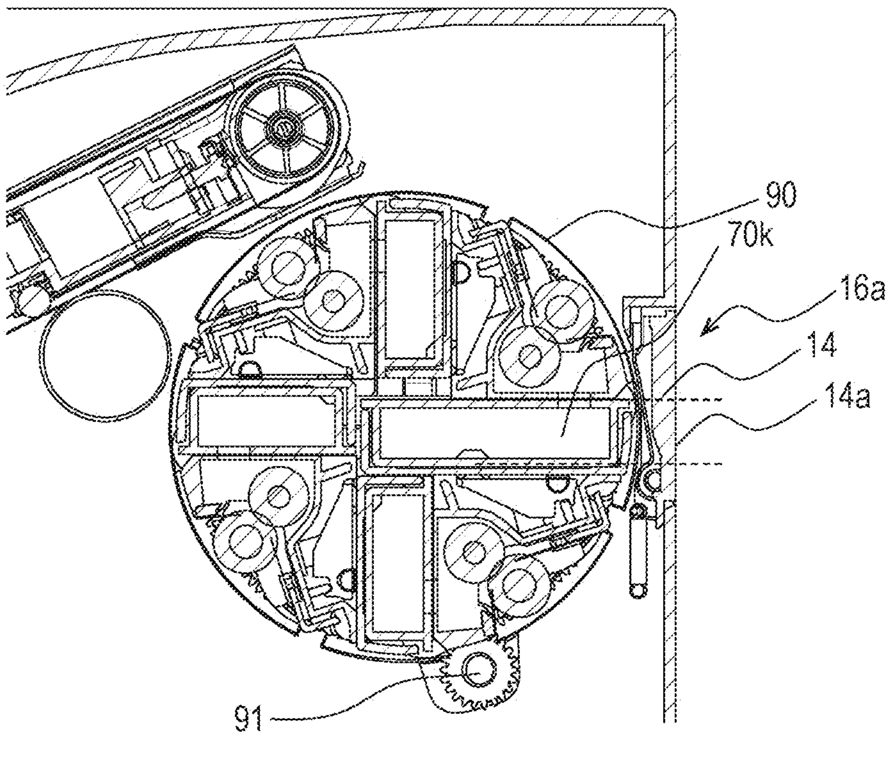
Figure 5:
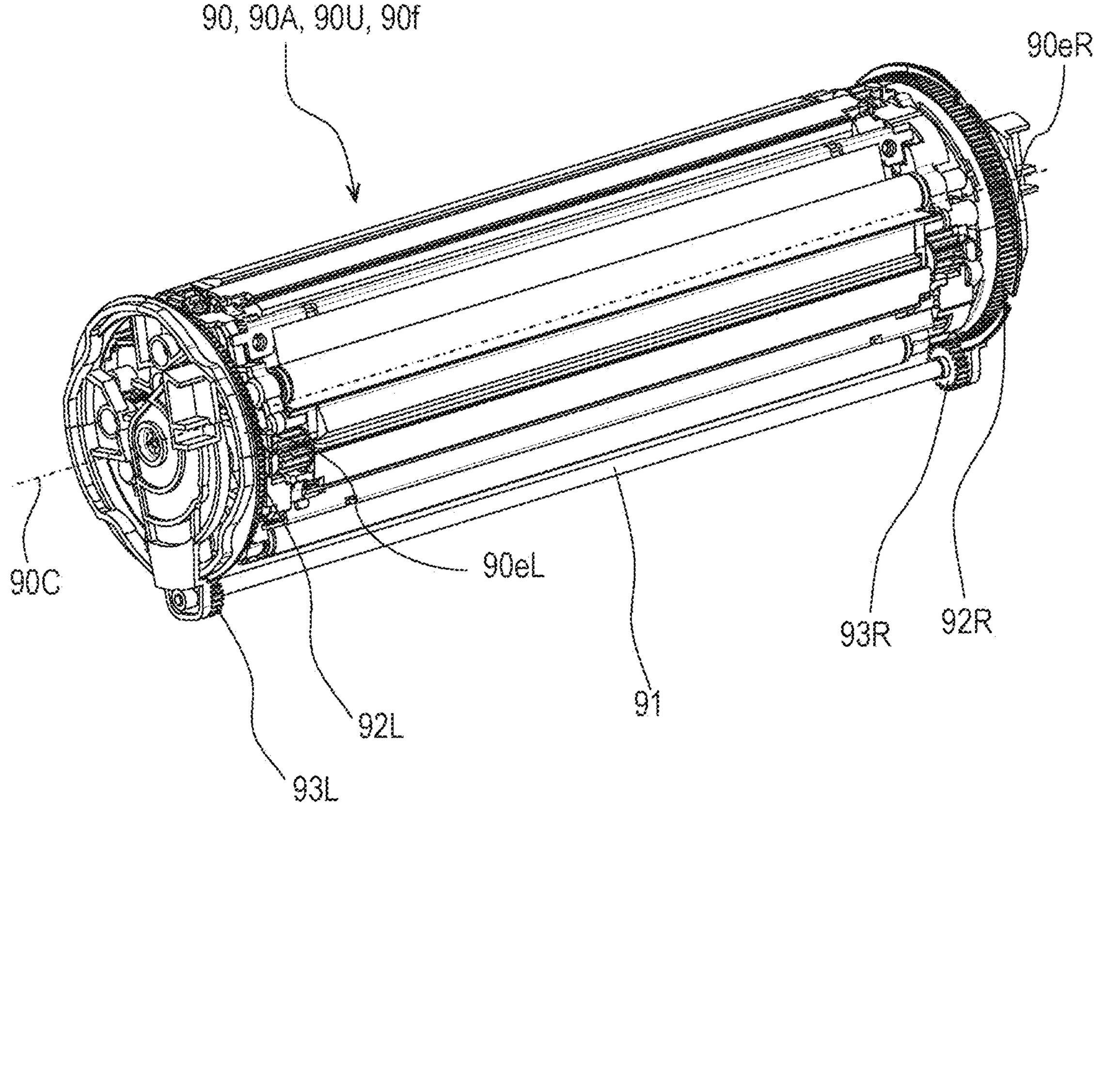
FIG. 5 is a perspective view of a rotary body according to the first embodiment.

FIGS. 4A and 4B are sectional views illustrating the rotary body 90 of the image forming apparatus 1 and the periphery thereof. FIGS. 4A and 4B are sectional views obtained by cutting the apparatus along an imaginary plane perpendicular to the rotational axis 90C of the rotary body 90. FIG. 5 is a perspective view of the rotary body 90.

As described above, the toner cartridges 70$y$ to 70$k$ are attachable to and detachable from the rotary body 90. When the toners in the toner cartridges 70$y$ to 70$k$ have run out, a user can replenish the image forming apparatus 1 with toners by replacing the toner cartridges 70$y$ to 70$k$.

As illustrated in FIG. 1, the apparatus body 1A includes a frame body 16 that accommodates the rotary body 90.

The frame body 16 is a body frame of the image forming apparatus 1 in the present embodiment. The frame body 16 is a housing (framework) of the apparatus body 1A constituted by a frame and an exterior member and has a substantially rectangular parallelepiped shape in the present embodiment.

The frame body 16 has an opening 16$a$. More specifically, the frame body 16 has a side surface 16$b$ extending in a direction intersecting the horizontal direction. The side surface 16$b$ constitutes at least a portion of an appearance surface of the apparatus body 1A on the +X side. The opening 16$a$ is arranged in this side surface 16$b$. In a discharge direction in which the sheet S on which an image has been formed is discharged through a discharge port of the apparatus body 1A, the side surface 16$b$ is a side surface arranged on the downstream side of the discharge port. A user can access the sheet storage portion 300 from the side of the side surface 16$b$ of the image forming apparatus 1 to replenish the sheet S or to obtain the sheet S discharged through the discharge port. Thus, it can be said that the side surface 16$b$ is the front face (front surface) of the apparatus body 1A.

The toner cartridges 70$y$, 70$m$, 70$c$, and 70$k$ are attachable to and detachable from the rotary body 90 through the opening 16$a$. That is, the toner cartridge 70$k$ is an example of the first toner cartridge that stores a toner to be supplied to the first development roller (development roller 51$k$) and that is attachable to and detachable from the rotary (rotary body 90) through the opening 16$a$ of the frame body 16 of the apparatus body 1A.

The toner cartridge 70$m$ is an example of the second toner cartridge that stores a toner to be supplied to the second development roller (development roller 51$m$) and that is attachable to and detachable from the rotary (rotary body 90) through the opening 16*a* of the frame body 16 of the apparatus body 1A.

In the present embodiment, the toner cartridges 70*y*, 70*m*, 70*c*, and 70*k* are attached and detached in a state of being supported by the trays 80*y*, 80*m*, 80*c*, and 80*k* respectively, to and from the rotary body 90 through the opening 16*a*.

In other words, a user can attach and detach the toner cartridges 70*y* to 70*k* to and from the rotary body 90 via the trays 80*y*, 80*m*, 80*c*, and 80*k* respectively.

The opening 16*a* is arranged in the side surface 16*b* of the frame body 16 substantially parallel to the rotational axis 90C of the rotary body 90. Therefore, during replacement of the toner cartridge 70, the toner cartridge 70 passes through the opening 16*a* in a direction intersecting (can be a direction orthogonal to) the rotational axis 90C.

The image forming apparatus 1 includes a door 14 that covers the opening 16*a* of the frame body 16. The door 14 is an opening-closing member that is movable to a close position (see also FIG. 6A) to coverer the opening 16*a* and to an open position (see also FIGS. 6B and 6C) to expose the opening 16*a*. The door 14 is an opening-closing member that is provided to be movable, with respect to the frame body 16, between the close position to cover the opening 16*a* and the open position to uncover the opening 16*a* so that the tray 80 can move from the mount position to the retraction position through the opening 16*a*. The door 14 is configured to move from the close position to the open position in conjunction with the movement of the tray 80 moving from the mount position to the retraction position. The door 14 is also configured to move from the open position to the close position in conjunction with the movement of the tray 80 moving from the retraction position to the mount position.

As described above, in the present embodiment, the toner cartridge 70 is configured to be attachable to and detachable from the rotary body 90 via the tray 80. It is thus possible to attach and detach the toner cartridge 70 to and from the rotary body 90 stably.

More specifically, a user can replace the toner cartridge 70 by an operation of attaching and detaching of the toner cartridge 70 to and from the tray 80 configured to be movable with respect to the rotary body 90 (that is, with respect to the apparatus body 1A). As a comparative example, in a configuration in which toner cartridges are removed/inserted directly with respect to an apparatus body by a user in cartridge replacement, the user is required to insert a toner cartridge to a predetermined mount position inside the apparatus body. In the present embodiment, the tray 80 is movable in a state of supporting the toner cartridge 70 such that the toner cartridge 70 moves to the mount position. Therefore, a user can replace the toner cartridge 70 by a simple operation of placing the toner cartridge 70 onto the tray 80, which improves operability.

The toner cartridge 70 has an elongated shape in a longitudinal direction that is the Y-direction parallel to the rotational axis 90C of the rotary body 90. That is, the dimension of the toner cartridge 70 in the longitudinal direction is larger than each of the height and the width of the toner cartridge 70 in a cross-section orthogonal to the longitudinal direction. When handling the toner cartridge 70 having such an elongated shape, with the opening 16*a* being arranged in the side surface 16*b* of the frame body 16 substantially parallel to the longitudinal direction (Y-direction) of the toner cartridge 70, it is possible to cause the toner cartridge 70 to pass through the opening 16*a* by a short movement distance. For example, compared with when the toner cartridge 70 is removed/inserted through an opening provided in a side surface of the frame body 16 on either one side (+Y side or −Y side) in the longitudinal direction of the toner cartridge 70, replacement of the toner cartridge 70 is easily performed.

The rotary body 90 can be in a replacement orientation that allows detachment of any one of the toner cartridges 70*y* to 70*k* from the rotary body 90 by rotating about the rotational axis 90C. An orientation that allows detachment of the toner cartridge 70*y* is referred to as a yellow replacement orientation. An orientation that allows detachment of the toner cartridge 70*m* is referred to as a magenta replacement orientation. An orientation that allows detachment of the toner cartridge 70*c* is referred to as a cyan replacement orientation.

An orientation that allows detachment of the toner cartridge 70*k* is referred to as a black replacement orientation. The black replacement orientation is an example of a first replacement orientation that allows detachment of the first toner cartridge from the rotary. The yellow/magenta/cyan replacement orientations are examples of a second replacement orientation that allows detachment of the second toner cartridge from the rotary. The yellow/magenta/cyan/black replacement orientations can be also referred to as first to fourth replacement orientations. These orders are merely used for convenience of description and can be replaced, as appropriate, basically.

FIG. 4A illustrates a cross-section of the rotary body 90 in the development orientation (specifically, the yellow development orientation). FIG. 4B illustrates a cross-section of the rotary body 90 in the replacement orientation (specifically, the black replacement orientation).

As illustrated in FIGS. 4A and 4B, the four trays 80*y* to 80*k* are attached to the rotary body 90. The trays 80*y* to 80*k* hold the toner cartridges 70*y* to 70*k*, respectively. In FIGS. 4A and 4B, the trays 80*y* to 80*k* are in a state of being accommodated inside the rotary body 90, and it can be said that this state is a state in which the toner cartridges 70*y*, 70*m*, 70*c*, and 70*k* are mounted on the developing units 50*y*, 50*m*, 50*c*, and 50*k*, respectively.

As described above, the toner cartridge 70 is movable to the mount position and to the retraction position retracted from the mount position with respect to the development frame body 53 of the developing unit 50. That is, with respect to the first storage frame body (development frame body 53*k*), the first toner cartridge (toner cartridge 70*k*) is movable to a first mount position and to a first retraction position. With respect to the second storage frame body (development frame body 53*m*), the second toner cartridge (toner cartridge 70*m*) is movable to a second mount position and to a second retraction position.

In a state in which the toner cartridge 70 is at the mount position with respect to the development frame body 53, the discharge opening 71*b* faces the reception opening 53*b* as illustrated in FIG. 3. The toner cartridge 70 is configured to supply a toner to the development-side storage portion 53*a* through the reception opening 53*b* (opening of the storage frame body) in this state.

The apparatus body 1A includes a moving device 85 configured to move the toner cartridge 70 with respect to the rotary body 90 (more specifically, with respect to the development frame body 53 of the developing unit 50) from the mount position to the retraction position. The moving device 85 will be described later with reference to FIG. 8 and the like. In the present embodiment, a plurality of moving devices 85*k* to 85*y* corresponding to the plurality of toner cartridges 70*y* to 70*k*, respectively, are disposed at the rotary body 90. It can be said that the trays 80*y* to 80*k* are part of these moving devices 85*k* to 85*y*, respectively.

In the present embodiment, the toner cartridge 70*k* that stores the black toner has a larger size than the toner cartridges 70*y* to 70*c* that store the yellow toner, the magenta toner, and the cyan toner, respectively, and the toner cartridge 70*k* can store a larger amount of the toner. In other words, the first toner cartridge can store a first amount of the toner, the second toner cartridge can store a second amount of the toner, and the first amount is larger than the second amount.

Specifically, a length of the black toner cartridge 70*k* in a first radial direction with respect to the rotational axis 90C of the rotary body 90 is longer than a length of the magenta toner cartridge 70*m* in a second radial direction. Here, the first radial direction is a turning radius direction (radial direction of an imaginary circle centered at the rotational axis 90C) of the rotary body 90 and is a direction in which the toner cartridge 70*k* extends with respect to the rotational axis 90C when viewed in the direction along the rotational axis 90C. The second radial direction is the turning radius direction of the rotary body 90 and is a direction in which the toner cartridge 70*m* extends with respect to the rotational axis 90C when viewed in the direction along the rotational axis 90C. Similarly, the length of the black toner cartridge 70*k* in the first radial direction is longer than a length of each of the other toner cartridges 70*y* and 70*c* in a radial direction corresponding to each of the toner cartridges 70*y* and 70*c*.

Thus, the tray 80*k* that holds the black toner cartridge 70*k* has a larger size than each of the trays 80*y* to 80*c* that hold the other toner cartridges 70*y*, 70*m*, and 70*c*, respectively. That is, the four toner cartridges 70*y* to 70*k* having different sizes and the four trays 80*y* to 80*k* having different sizes are disposed in the rotary body 90. In other words, the first toner cartridge (toner cartridge 70*k*) and the second toner cartridge (toner cartridge 70*m*) having a smaller size than the first toner cartridge can be attached to and detached from the rotary body 90. To correspond to this, the first support member (tray 80*k*) that supports the first toner cartridge and the second support member (tray 80*m*) that has a smaller size than the first support member are provided in the rotary body.

Here, with reference to FIG. 5, rotary drive of the rotary body 90 will be described. As illustrated in FIG. 5, disc gears 92L and 92R are each formed at a corresponding one two end portions of the rotary body 90. In addition, rotary drive gears 93L and 93R are each coupled to a corresponding one of two end portions of a swing shaft 91 such that drive transmission is enabled. Here, the driving force of the motor M1 is transmitted to the rotary drive gear 93R by a drive transmitting mechanism. Next, the rotary drive gears 93L and 93R transmit the driving force to the disc gears 92L and 92R, thereby rotationally driving the rotary body 90.

The rotary body 90 is supported to be swingable about the swing shaft 91. The rotary body 90 is urged in the counter-clockwise direction in FIGS. 4A and 4B about the swing shaft 91 by an urging member (not illustrated). It can be said that this direction is a direction in which each of the development rollers 51*y* to 51*k* approaches the photosensitive drum 2. As a result, each of the development rollers 51*y* to 51*k* is in contact with the photosensitive drum 2 in a state in which the rotary body 90 is in the development orientation.

Meanwhile, as illustrated in FIG. 5, rotary cams 90*e*L and 90*e*R are each provided at a corresponding one of two end portions of the rotary body 90. When the rotary body 90 rotates clockwise in FIGS. 4A and 4B about the rotational axis 90C, the rotary cams 90*e*L and 90*e*R come into contact with a roller 96 (FIGS. 4A and 4B) supported by the frame body 16. Then, the rotary cams 90*e*L and 90*e*R move in the clockwise direction in FIG. 4A and FIG. 4B about the swing shaft 91. It can be said that this direction is a direction in which each of the development rollers 51*y* to 51*k* moves away from the photosensitive drum 2. In addition, it can be said that this direction is a direction in which the rotary body 90 approaches the opening 16*a* of the frame body 16 and the door 14.

Thus, when the rotary body 90 rotates to switch from the development orientation to the replacement orientation, the rotary body 90 swings about the swing shaft 91. In a state in which the rotary body 90 is in the replacement orientation, the development roller 51 is spaced apart from the photosensitive drum 2.

As illustrated in FIG. 4B, in the black replacement orientation, the toner cartridge 70*k* is stopped at a position to face the opening 16*a*, which is provided in the side surface 16*b* of the apparatus body 1A, and the door 14. In this state, when the tray 80*k* is slid to move from the mount position with respect to the developing unit 50*k* to the outside of the rotary body 90, a user can replace the toner cartridge 70*k*.

Toner Cartridge Replacement Operation

Figure 6A:
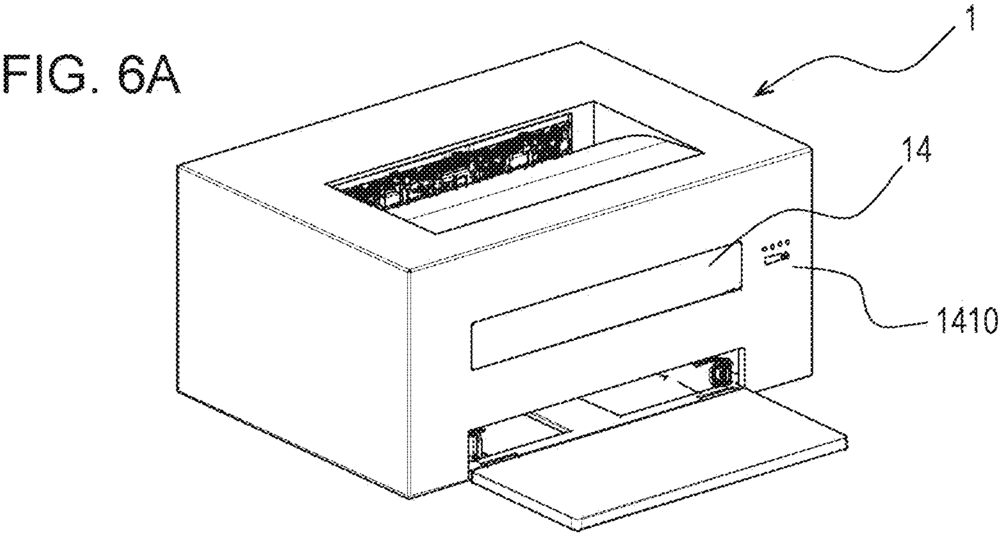
FIGS. 6A, 6B, and 6C are perspective views of the image forming apparatus according to the first embodiment.
Figure 6B:
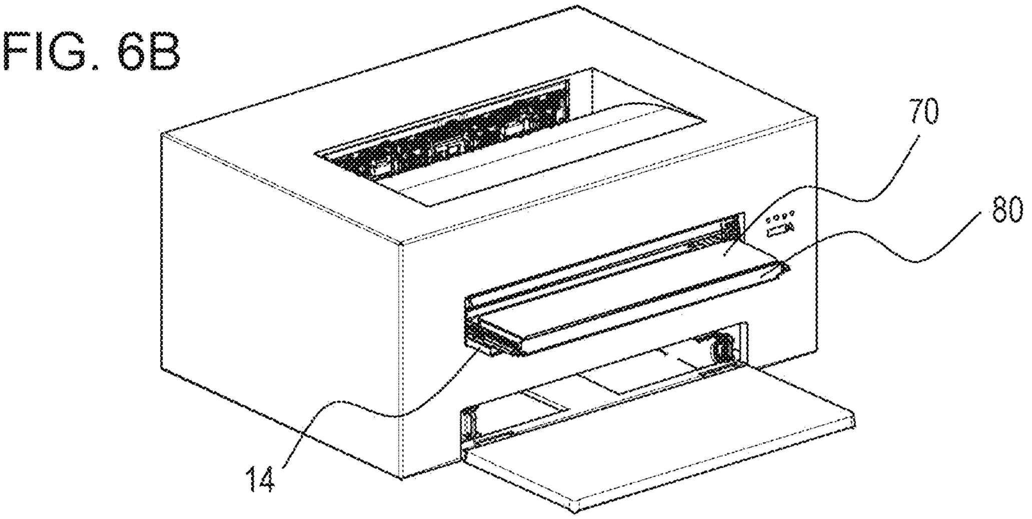
Figure 6C:
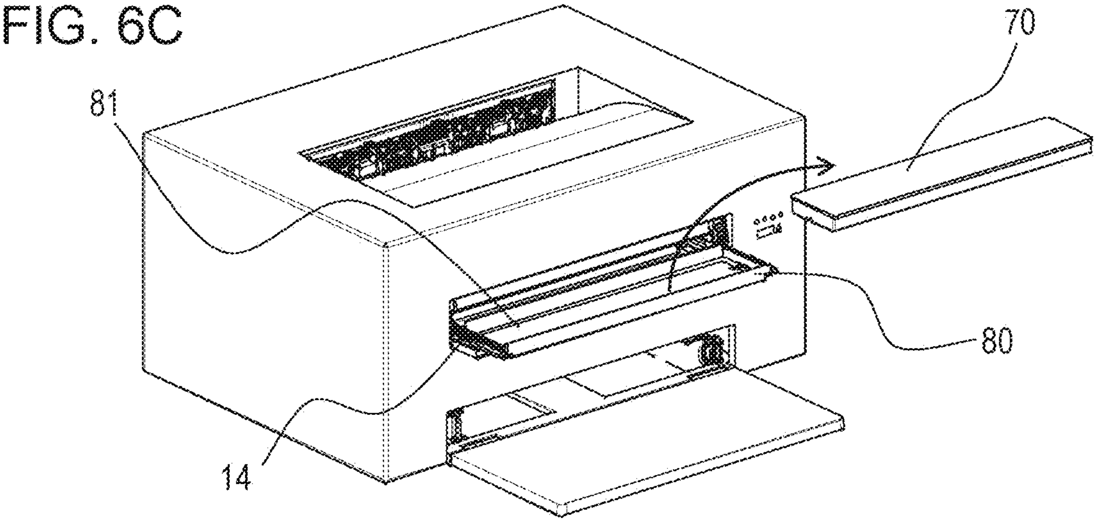
Figure 7A:
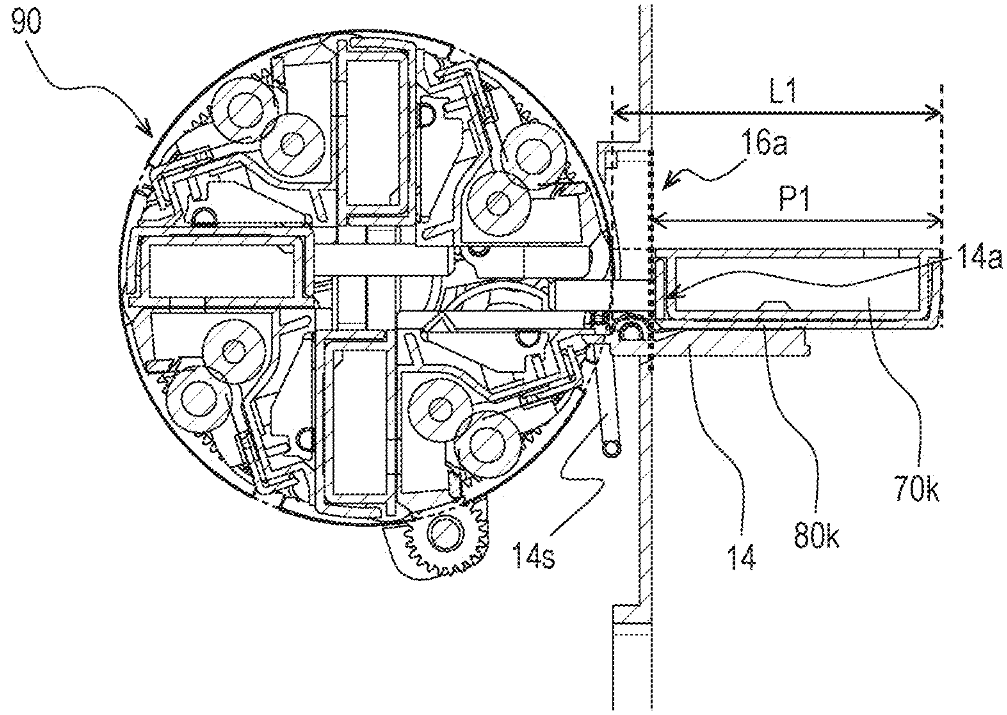
FIGS. 7A and 7B are sectional views of the image forming apparatus according to the first embodiment.
Figure 7B:
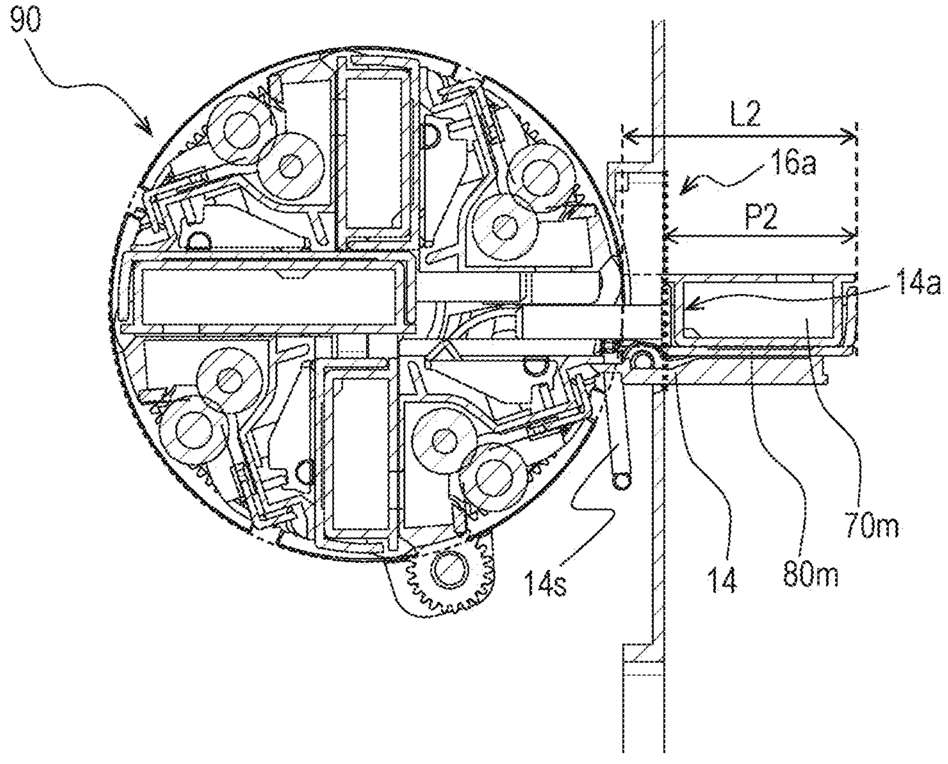

With reference to FIG. 4A, FIGS. 6A to 6C, and FIGS. 7A and 7B, a toner cartridge replacement operation will be described. FIGS. 6A to 6C are external views of the apparatus body 1A. FIGS. 7A and 7B are sectional views around the rotary body 90 during toner cartridge replacement. FIGS. 7A and 7B are sectional views of the apparatus in an imaginary plane perpendicular to the rotational axis 90C of the rotary body 90.

FIG. 6A illustrates an appearance of the apparatus body 1A during an image forming operation and in a standby state. The "during an image forming operation" denotes during an execution period of a series of operations until the image forming apparatus 1 discharges the sheet S as a product after feeding the sheet S and forming an image onto the sheet S. The standby state denotes a state in which the image forming apparatus 1 can start an image forming operation when the image forming apparatus 1 receives an image formation instruction (print instruction) and is a state of waiting for an image forming instruction from a user. As illustrated in FIG. 6A, the door 14 is in a closed state during the image forming operation and in the standby state.

FIG. 6B illustrates an appearance of the apparatus body 1A during toner cartridge replacement. During toner cartridge replacement, the door 14 is in an opened state, and the tray 80 and the toner cartridge 70 are moved to the apparatus body 1A.

The toner cartridge 70 is movable with respect to the development frame body 53 of the developing unit 50 to the mount position and to the retraction position retracted from the mount position. In a state in which the toner cartridge 70 is at the mount position with respect to the development frame body 53, the discharge opening 71*b* faces the reception opening 53*b* as illustrated in FIG. 3. As illustrated in FIGS. 4A and 4B, the rotary body 90 is configured to, in a state in which the toner cartridge 70 is at the mount position, rotate about the rotational axis 90C into the development orientation or the replacement orientation.

A toner cartridge replacement operation will be described. First, a user instructs a control unit of the apparatus body 1A to perform a toner cartridge replacement operation. The instruction for a toner cartridge replacement operation is, for example, input through an operation panel (operation part) provided at the apparatus body 1A. The control unit is configured to be capable of detecting a remaining amount of a toner inside a toner cartridge by a remaining-amount detection mechanism (not illustrated). Regarding each of the four toner cartridges 70y to 70k, the control unit can inform a user of information indicating that a toner runs out by a method, such as screen display on the operation panel, on the basis of a result of detection of a toner remaining amount.

When the control unit receives an instruction for a toner cartridge replacement operation, the rotary body 90 rotates to a replacement orientation for the toner cartridge 70 (toner cartridge 70 in which the toner runs out) as a replacement target and stops. That is, the control unit causes the rotary body 90 to rotate into a replacement orientation (the black replacement orientation for replacing the black toner cartridge 70k in FIG. 4B) for a toner cartridge designated in an instruction for a toner cartridge replacement operation. In the replacement orientation, the tray 80 that supports the toner cartridge 70 for which replacement has been instructed faces the opening 16a of the frame body 16 of the apparatus body 1A.

For example, the rotary body 90 in FIG. 4A is in the yellow development orientation in which the development roller 51y for yellow faces the photosensitive drum 2. At this time, the black toner cartridge 70k and the tray 80k may not necessarily face the opening 16a and the door 14. In other words, the toner cartridge 70 and the tray 80 may not necessarily face the opening 16a and the door 14 when the rotary body 90 is in a replacement orientation other than the replacement orientation for the toner cartridge 70 or in the development orientation. Thus, the opening 16a can have a size that allows individual passage of each toner cartridge 70. When the rotary body 90 in the yellow replacement orientation rotates clockwise in FIG. 4B by a predetermined angle, the black toner cartridge 70k and the tray 80k face the opening 16a and the door 14 as illustrated in FIG. 4B.

Here, "the tray 80 faces the opening 16a" means that the tray 80 is located to be movable to the outside of the apparatus body 1A through the opening 16a. That is, when the tray 80 faces the opening 16a, the tray 80 and the toner cartridge 70 supported by the tray 80 can protrude to the outside of the apparatus body 1A as a result of the tray 80 being moved outward in the turning radius direction of the rotary body 90 by a moving mechanism (described later). In FIG. 4A, none of the trays 80y to 80k face the opening 16a. In FIG. 4B, only the tray 80k for black faces the opening 16a while the other trays 80y to 80c do not face the opening 16a.

When the rotary body 90 is positioned at a replacement orientation, the motor M2 moves the tray 80 that supports the toner cartridge 70 that is a replacement target toward the outside of the apparatus body 1A.

Consequently, the toner cartridge 70, which is a replacement target, moves from the mount position to the retraction position with respect to the rotary body 90. In addition, as illustrated in FIG. 6A and FIGS. 7A and 7B, the tray 80 and the toner cartridge 70 as the replacement target supported by the tray 80 protrude to the outside of the apparatus body 1A through the opening 16a.

More specifically, the tray 80 is movable with respect to the rotary body 90 to an accommodation position and a removal position. The accommodation position is a position in which the tray 80 is accommodated in the rotary body 90. The removal position is a position (detachment position/replacement enabled position) in which the tray 80 protrudes to the outside of the rotary body 90 to enable removal of the toner cartridge 70 from the tray 80. Examples of the accommodation position are the positions of the trays 80y to 80k in FIGS. 4A and 4B. Examples of the removal position are the positions of the tray 80 in FIGS. 6B and 6C, the position of the tray 80k in FIG. 7A, and the position of the tray 80m in FIG. 7B.

When the tray 80 is at the accommodation position, the toner cartridge 70 attached to the tray 80 is located inside the rotary body 90 and located at the mount position. When the tray 80 is at the removal position, the toner cartridge 70 attached to the tray 80 is located outside of the rotary body 90 and located at the retraction position. The tray 80 moves with respect to the rotary body 90 to the retraction position and to the mount position.

Here, the rotary body 90 includes a protruding portion 95 for holding the tray 80 at the accommodation position and holding the toner cartridge 70 at the mount position. The tray 80 is provided with a recessed portion 87 to which the protruding portion 95 is to be fitted. The protruding portion 95 and the recessed portion 87 are also provided for each of the trays 80y to 80k.

The tray 80 is locked to the rotary frame body 90f as a result of the protruding portion 95 being fitted to the recessed portion 87 of the tray 80. Consequently, the tray 80 stays at the accommodation position even when the rotary body 90 rotates, which avoids the toner cartridge 70 moving from the mount position. When the tray 80 is moved between the accommodation position and the removal position by the moving device, (described later), the tray 80 can move over the protruding portion 95.

In the present embodiment, the door 14 is supported to be turnable with respect to the apparatus body 1A. As illustrated in FIG. 7A, the door 14 is urged by a spring 14s in a direction from the open position toward the close position. The spring 14s is, for example, a tension spring and urges the door 14 such that a moment in the counterclockwise direction about a spindle 14c of the door 14 in FIGS. 7A and 7B is generated.

The tray 80 pressing the door 14 causes the door 14 to be in the opened state (the state in FIG. 6B). It can be said that this state is a state in which the tray 80 is supported by the door 14. With the door 14 supporting at least a portion of the tray 80 protruding to the outside of the apparatus body 1A, the toner cartridge 70 can be more stably supported. In other words, when the first toner cartridge (toner cartridge 70k) is at the first retraction position, the opening-closing member (door 14) at the open position supports the first support member (tray 80k). In addition, when the second toner cartridge (toner cartridges 70y to 70c) is at the second retraction position, the opening-closing member (door 14) at the open position supports the second support member (trays 80y to 80c).

The door 14 is configured to come, at the open position, into contact with a portion (for example, a lower edge 16c of the opening 16a) of the frame body 16 of the apparatus body 1A so as not to turn downward beyond the open position. When the tray 80 is returned from the outside to the inside of the apparatus body 1A, the door 14 is returned to the close position by the urging force of the spring 14s.

The toner cartridge 70 is held to be attachable to and detachable from the tray 80. Thus, as illustrated in FIG. 6C, a user can perform work (replacement work) of detaching the toner cartridge 70 from the tray 80 and attaching a new toner cartridge 70. For replacement of a plurality of toner cartridges 70, replacement work can be performed by repeating the above operation.

FIGS. 7A and 7B each illustrate a cross-section around the rotary body 90 during toner cartridge replacement.

FIG. 7A illustrates a state of the black toner cartridge 70*k* during replacement. FIG. 7B illustrates a state of the magenta toner cartridge 70*m* during replacement.

The image forming apparatus 1 includes the moving device 85 (FIG. 8) that moves the toner cartridge 70 from the mount position to the retraction position. It can be said that the moving device 85 includes the tray 80 in the present embodiment. The moving device 85*k* including the tray 80*k* is an example of a first moving device including the first support member. The moving device 85 including the tray 80*m* is an example of a second moving device including the second support member.

Even in a state in which the toner cartridge 70 is at the retraction position, the tray 80 is in a state of being coupled to the rotary body 90 (in a state of being supported by the rotary body 90). The length of protrusion of the toner cartridge 70 at the retraction position from the rotary body 90 can be long for easily performing an operation of detaching the toner cartridge 70 from the rotary body 90. Even when the length of protrusion of the toner cartridge 70 from the rotary body 90 is long, the tray 80 can stably support the toner cartridge 70 since the toner cartridge 70 is configured to be attachable to and detachable from the rotary body 90 via the tray 80.

The movement direction of the toner cartridge 70 when the toner cartridge 70 moves from the mount position to the retraction position is referred to as a retracting direction. In the present embodiment, the retracting direction of the toner cartridge 70 is a direction intersecting the direction (Y-direction) along the rotational axis 90C. Therefore, as illustrated in FIG. 7A and FIG. 7B, the retracting direction of the toner cartridge 70 when viewed in the direction (Y-direction) along the rotational axis 90C is a direction orthogonal to the direction (Y-direction) along the rotational axis 90C. In addition, it can be said that the retracting direction of the toner cartridge 70 is a direction (direction away from the rotational axis 90C) toward the outer side in the turning radius direction of the rotary body 90.

For a user to perform an operation of detaching the toner cartridge 70 from the rotary body 90, at least a portion of the toner cartridge 70 can protrude as illustrated in FIGS. 7A and 7B from the rotary body 90 during detachment of the toner cartridge 70. In the present embodiment, when the toner cartridge 70 is at the retraction position, the entirety of the toner cartridge 70 protrudes from the rotary body 90.

It can be said that, when the rotary body 90 rotates about the rotational axis 90C, the rotational trajectory of the rotary body 90 coincides with a circumscribed circle of the rotary body 90 centered at the rotational axis 90C. When the toner cartridge 70 is at the retraction position, a half or more of the length of the toner cartridge 70 in the retracting direction can be located outside the rotational trajectory of the rotary body 90. That is, a half or more of the entire length of the toner cartridge can be, when viewed in the rotational axis direction of the rotary, located outside the rotational trajectory of the rotary in the movement direction of the toner cartridge that moves from the mount position toward the retraction position in a state in which the toner cartridge is at the retraction position. This also applies to each of the toner cartridges 70 including the toner cartridge 70*k* as an example of a first cartridge and the toner cartridge 70*m* as an example of a second cartridge. In the present embodiment, the entirety of the toner cartridge 70 is located outside the rotational trajectory of the rotary body 90 when the toner cartridge 70 is at the retraction position.

Further, to make it easier for a user to grab the toner cartridge 70, at least a portion of the toner cartridge 70 can be located apparatus-outside of the image forming apparatus 1 (apparatus outside of the apparatus body 1A) when the toner cartridge 70 is at the retraction position. Here, the apparatus-outside refers to a space that is present outside (outside of the apparatus body 1A) of the image forming apparatus 1 when the image forming apparatus 1 is used, for example, to perform an image forming operation with respect to the sheet S.

In the present embodiment, the appearance surface of the apparatus body 1A is formed by the appearance surface of the frame body 16. That is, it can be said that the apparatus-outside is the outside of the frame body 16. Therefore, it can be said that a state in which at least a portion of the toner cartridge 70 is located apparatus-outside is a state in which at least a portion of the toner cartridge 70 protrudes toward the outside of the frame body 16 through the opening 16*a* of the frame body 16 of the apparatus body 1A.

In the present embodiment, when the door 14 is at the close position, the opening 16*a* of the frame body 16 of the apparatus body 1A is covered by the door 14. In addition, an appearance surface 14*a* of the door 14 at the close position forms a portion of the appearance surface of the apparatus body 1A. In this case, the apparatus-outside refers to outside the appearance surface 14*a* of the door 14 at the close position. That is, when the position of the appearance surface 14*a* of the door 14 that is located at the close position is referred to as an appearance position, at least a portion of the toner cartridge 70 is located outside of the apparatus body 1A further than this appearance position when the toner cartridge 70 is at the retraction position.

In other words, at least a portion of the toner cartridge 70 is located in a space outside the apparatus body 1A if the door 14 is at the close position. Then, at least a portion of the toner cartridge 70 is located on the downstream side of the appearance position in the retracting direction of the toner cartridge 70.

In addition, it can be said that, when the side surface 16*b* having the opening 16*a* is considered as the front face of the apparatus body 1A, at least a portion of the toner cartridge 70 protrudes on the front face side from the appearance surface on the front face side of the apparatus body 1A when the toner cartridge 70 is at the retraction position. In this case, a user can access the toner cartridge 70 from the front face side of the image forming apparatus and easily perform replacement work of the toner cartridge 70.

A half or more of the length of the toner cartridge 70 in the retracting direction can be located apparatus-outside when the toner cartridge 70 is at the retraction position. That is, a half or more of the entire length of the toner cartridge can be, when viewed in the rotational axis direction of the rotary, located outside of the body frame in the movement direction of the toner cartridge that moves from the mount position toward the retraction position in a state in which the toner cartridge is at the retraction position. This also applies to each of the toner cartridges 70 including the toner cartridge 70*k* as an example of the first cartridge and the toner cartridge 70*m* as an example of the second cartridge. The entirety of the toner cartridge 70 can be located apparatus-outside when the toner cartridge 70 is at the retraction position.

The tray 80 includes a cartridge holding portion 81 (see FIG. 3 and FIG. 6C) that holds the toner cartridge 70. The cartridge holding portion 81 is a mount target portion to which the toner cartridge 70 is to be mounted. When the tray 80 is at the removal position, the entirety of the cartridge holding portion 81 can be located outside the rotational trajectory of the rotary body 90 in the retracting direction.

When the tray 80 is at the removal position, a half or more of the length of the cartridge holding portion 81 can be located apparatus-outside in the retracting direction.

Here, as described above, the toner cartridge 70*k* has a larger size than each of the other toner cartridges 70*y* to 70*c*, and the tray 80*k* has a larger size than each of the other trays 80*y* to 80*c*. Therefore, as illustrated in FIGS. 7A and 7B, the movement amount of the tray 80 in toner cartridge replacement is varied in accordance with the size of the toner cartridge 70 in the present embodiment.

Specifically, as illustrated in FIG. 7A, a movement distance when tray 80*k* (first support member) moves from the accommodation position (first accommodation position) to the removal position (first removal position) is L1. A movement distance when the tray 80*m* (second support member) moves from the accommodation position to the removal position (third removal position) is L2. In FIG. 7B, a state in which the toner cartridge 70*m* and the tray 80*m* have moved is illustrated. A movement distance when each of the trays 80*y* and 80*c* moves from the accommodation position to the removal position is also L2. At this time, L1 is larger than the L2. In other words, a movement distance of the first support member when the first toner cartridge moves from the first mount position to the first retraction position is longer than a movement distance of the second support member when the second toner cartridge moves from the second mount position to the second retraction position.

As illustrated in FIG. 7A, in a state in which the tray 80*k* is at the removal position with the toner cartridge 70*k* at the retraction position, the toner cartridge 70*k* protrudes to the apparatus-outside from the appearance surface of the apparatus body 1A by a distance P1. In the present embodiment, the tray 80*k* also protrudes to the apparatus-outside from the appearance surface of the apparatus body 1A by the distance P1.

As illustrated in FIG. 7B, in a state in which the tray 80*m* is at the removal position with the toner cartridge 70*m* at the retraction position, the toner cartridge 70*m* protrudes to the apparatus-outside from the appearance surface of the apparatus body 1A by a distance P2. In the present embodiment, the tray 80*m* also protrudes to the apparatus-outside from the appearance surface of the apparatus body 1A by the distance P2. Each of the toner cartridges 70*y* and 70*c* also protrudes to the apparatus-outside from the appearance surface of the apparatus body 1A by the distance P2.

The aforementioned distance P1 is larger than the distance P2. That is, a length of protrusion of the first toner cartridge at the first retraction position through the opening 16*a* of the apparatus body 1A is referred to as a first length (P1), and a length of protrusion of the second toner cartridge at the second retraction position through the opening 16*a* is referred to as a second length (P2). In this case, the first length is longer than the second length.

For the aspect of strength, the distance P2 by which each of the toner cartridges 70*y* to 70*c* having a smaller size than the toner cartridge 70*k* protrudes at the retraction position to the apparatus-outside can be shorter than the distance P1 by which the toner cartridge 70*k* protrudes at the retraction position to the apparatus-outside. Reasons for this are as follows. When the toner cartridge 70 is located at the retraction position, at least a portion of the toner cartridge 70 protrudes to the outside of the rotational trajectory of the rotary body 90 or to the apparatus-outside from the appearance surface of the apparatus body 1A. At this time, in a state of being supported in a cantilever manner by the rotary body 90, the tray 80 supports the weight of the toner cartridge 70. Thus, shortening the distance P2 by which each of the toner cartridges 70*y* to 70*c* protrudes at the retraction position to the apparatus-outside can reduce a load applied to the trays 80*y* to 80*c* and a guide portion 97 of the rotary body 90 supporting the trays 80*y* to 80*k*. In addition, since the toner cartridges 70*y* to 70*c* each have a smaller size than the toner cartridge 70*k*, workability in cartridge replacement with respect to the trays 80*y* to 80*c* can be maintained even when the distance P2 is set to be shorter than the distance P1.

Arrangement of Trays in Rotary

Figure 8:
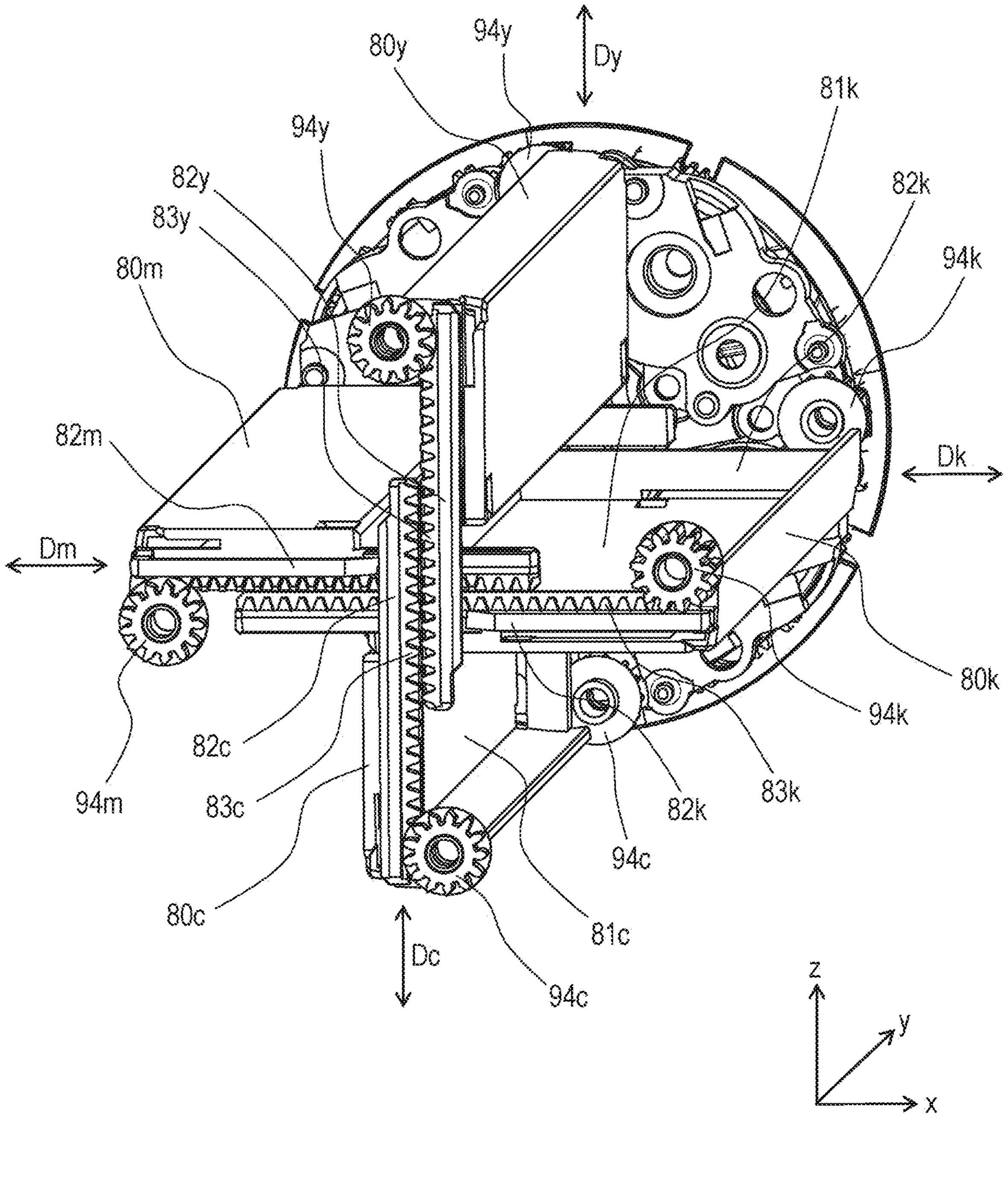
FIG. 8 is an explanatory view of the rotary body according to the first embodiment.
Figure 9:
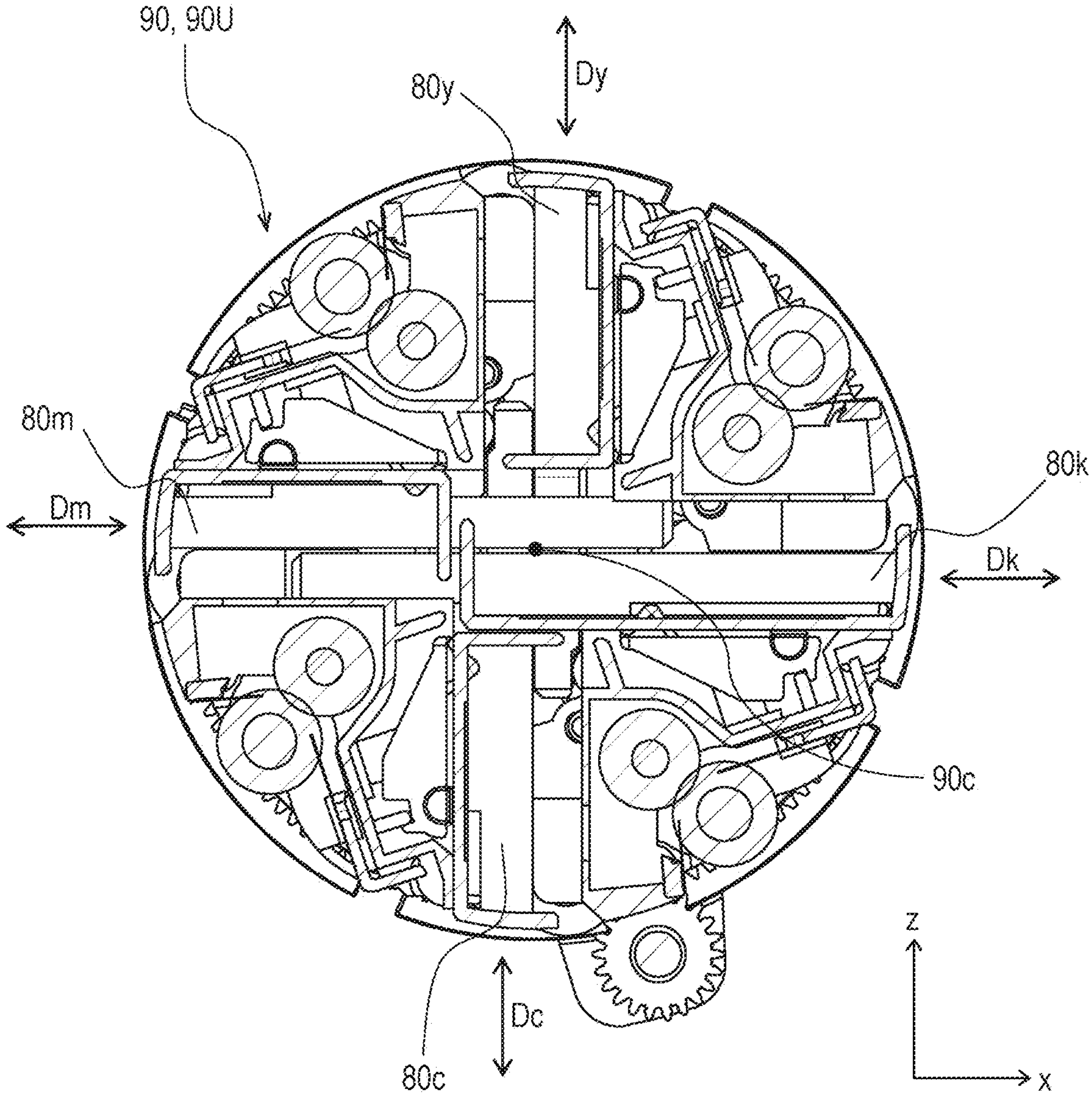
FIG. 9 is an explanatory view of the rotary body according to the first embodiment.
Figure 10:
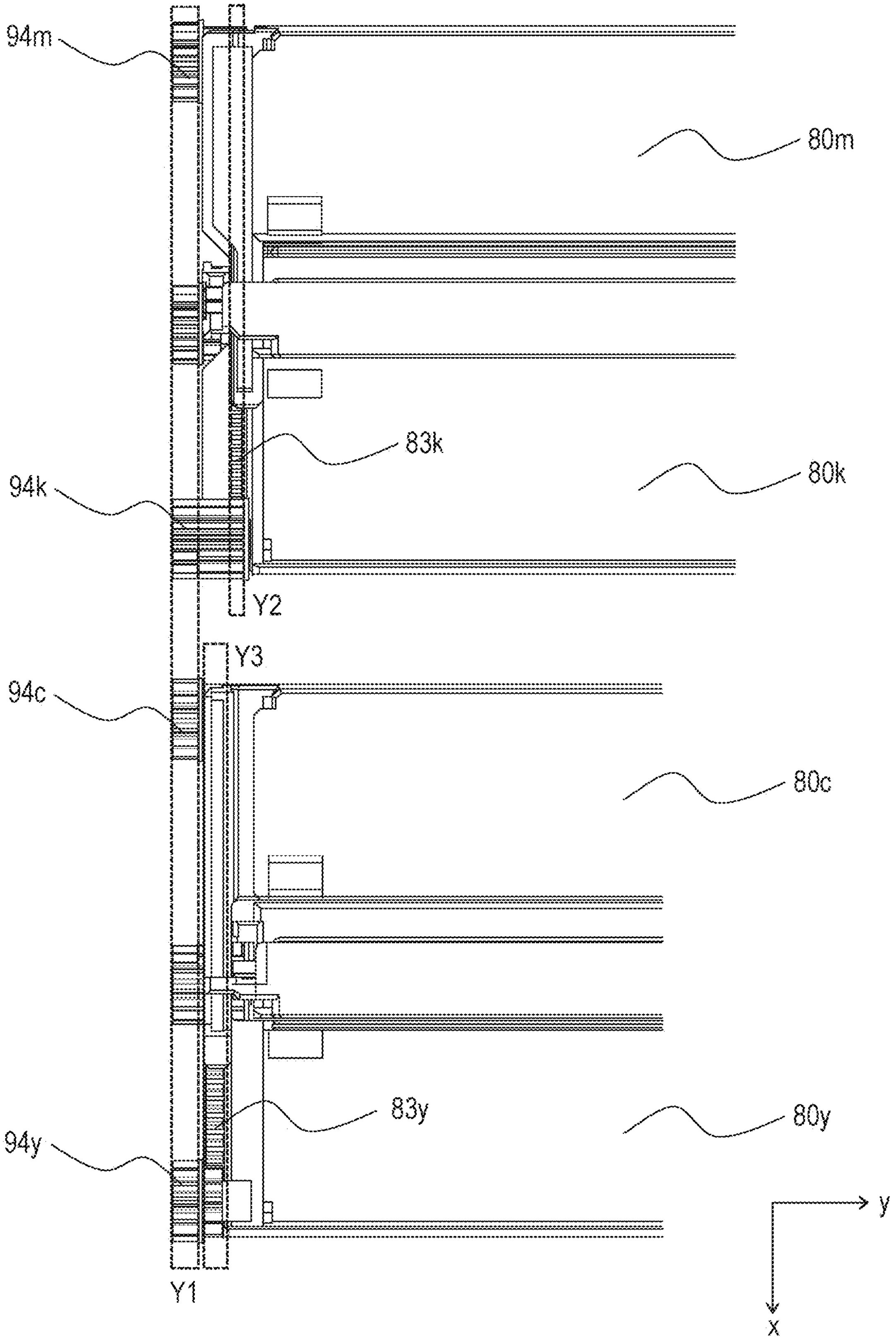
FIG. 10 is an explanatory view of the rotary body according to the first embodiment.

With reference to FIG. 8, FIG. 9, and FIG. 10, an arrangement of the trays 80*y* to 80*k* in the rotary body 90 will be described. FIG. 8 is a perspective view illustrating an arrangement of the trays 80*y* to 80*k* in the rotary body 90. FIG. 9 is a sectional view illustrating an arrangement of the trays 80*y* to 80*k* in the rotary body 90. FIG. 10 illustrates an arrangement of members on one end side of the trays 80*y* to 80*k* in the Y-direction. FIG. 9 illustrates a cut section of the rotary body 90 in an imaginary plane perpendicular to the rotational axis 90C of the rotary body 90. The upper half part of FIG. 10 illustrates the rotary body 90 and the trays 80*m* and 80*k* in FIG. 8 viewed from the right upper side (+Z side) in FIG. 8. The lower half part of FIG. 10 illustrates the rotary body 90 and the trays 80*c* and 80*y* in FIG. 8 viewed from the left side (−X side) in FIG. 8.

As illustrated in FIG. 8, each of the trays 80*y* to 80*k* is provided with a corresponding one of cartridge holding portions 81*y* to 81*k* and a corresponding one of guided portions 82*y* to 82*k*.

The toner cartridges 70*y* to 70*k* are mounted on the cartridge holding portions 81*y* to 81*k*, respectively. Each of the cartridge holding portions 81*y* to 81*k* accommodates at least a portion of a corresponding one of the toner cartridges 70*y* to 70*k* mounted thereon.

The guided portions 82*y* to 82*k* are provided at each of two end portions of the trays 80*y* to 80*k* corresponding thereto with the cartridge holding portions 81*y* to 81*k* interposed therebetween in the Y-direction, respectively. The guided portions 82*y* to 82*k* are each a member elongated in a direction orthogonal the rotational axis of the rotary body 90.

In the present embodiment, a reinforcement rib 82*k*1 is formed at a portion of the guided portion 82*k* in a movement direction Dk of the tray 80*k* and a reinforcement rib 82*m*1 is formed at a portion of the guided portion 82*m* in a movement direction Dm of the tray 80*m*. The reinforcement ribs 82*k*1 and 82*m*1 each have a rib shape (protruding shape) that protrudes outward in the Y-direction from the guided portion 82*k* or 82*m* corresponding thereto provided at each of the two end portions of the tray 80*k* or 80*m* in the Y-direction and that is elongated in a corresponding one of the movement direction Dk of the tray 80*k* and the movement direction Dm of the tray 80*m*. The reinforcement ribs 82*k*1 and 82*m*1 improve the rigidity of the guided portions 82*k* and 82*m*, respectively.

In the present embodiment, the length of each of the reinforcement ribs 82*m*1 and 82*k*1 is limited to avoid the guided portions 82*y* and 82*c*, respectively. However, when interference with respect to the guided portions 82*y* and 82*c* does not occur, the reinforcement ribs 82*m*1 and 82*k*1 may be provided so as to extend over the entire length of the guided portions 82*m* and 82*k*, respectively. Another reinforce rib may be added to each of the guided portions 82*y* and 82*c*. When the rigidity of the guided portions 82*m* and 82*k* is sufficient, a configuration without the reinforcement ribs 82*m*1 and 82*k*1 may be employed.

Rack portions 83*y* to 83*k* (rack gears) are formed at the guided portions 82*y* to 82*k*, respectively. Pinion gears 94*y* to

94*k* are rotatably held in the rotary body 90. The pinion gears 94*y* to 94*k* mesh with the rack portions 83*y* to 83*k*, respectively, such that drive transmission is enabled.

The rack portions 83*y* to 83*k* and the pinion gears 94*y* to 94*k* are part of the moving devices 85*y* to 85*k* configured to move the toner cartridges 70*y* to 70*k*, respectively, from the mount position to the retraction position. It can be said that the rack portions 83*y* to 83*k* and the pinion gears 94*y* to 94*k* are part of a driven device that is driven by the driving device 98 of the apparatus body 1A.

It can be said that the pinion gears 94*y* to 94*k* are rotors (rotary members) that move the trays 80*y* to 80*k* respectively, with respect to the rotary body 90 by rotating.

The pinion gears 94*y* to 94*k* and the rack portions 83*y* to 83*k* function as driven portions for the moving devices 85*y* to 85*k* of the rotary body 90 to receive a driving force from the driving device 98 of the apparatus body 1A. The pinion gear 94*k* and the rack portion 83*k* are an example of a first pinion gear and a first rack gear that constitute a first driven portion included in the first moving device. The pinion gear 94*m* and the rack portion 83*m* are an example of a second pinion gear and a second rack gear that constitute a second driven portion included in the second moving device.

The rotary body 90 includes the guide portion 97 that engages with each of the guided portions 82*y* to 82*k*.

In at least a part of the range of the movement, the guide portion 97 maintains a state of engaging with the guided portion 82 and guides the movement direction of the tray 80 while the tray 80 moves between the accommodation position and the removal position. In the present embodiment, the guide portion 97 maintains the state of engaging with the guided portion 82*k* in the entirety of the range of the movement of the tray 80*k* between the accommodation position and the removal position. In addition, in the present embodiment, the guide portion 97 maintains the state of engaging with the guided portion 82*m* in the entirety of the range of the movement of the tray 80*m* between the accommodation position and the removal position.

As illustrated in FIG. 8 and FIG. 9, the four trays 80*y* to 80*k* are disposed in the rotary body 90 so as to overlap each other as specifically described below.

When the pinion gears 94*y* to 94*k* rotate, the rack portions 83*y* to 83*k* and the trays 80*y* to 80*k* move with respect to the rotary body 90. As illustrated in FIG. 9, the four trays 80*y* to 80*k* are disposed in the rotary body 90 such that the movement directions of the trays 80*y* to 80*k* are rotated by 90 degrees from each other. Therefore, the tray 80*y*, the tray 80*c*, the tray 80*m*, and the tray 80*k* are held to be movable by sliding substantially in directions identical (parallel) to each other. The movement direction of each of the trays 80*y* to 80*k* during such sliding movement is restricted by the above-described engagement of the guide portion 97 with the guided portions 82*y* to 82*k*.

The trays 80*y* to 80*k* move to the apparatus-outside through the opening 16*a*. When each of the trays 80*y* to 80*k* moves to the apparatus-outside through the opening 16*a*, the movement directions of the trays are substantially identical (parallel) to each other.

As illustrated in FIG. 9, in the movement direction Dk of the tray 80*k* a range in which the tray 80*k* is disposed is arranged to overlap a range in which the tray 80*y* is disposed and a range in which the tray 80*c* is disposed. In the movement direction Dk of the tray 80*k* the range in which the tray 80*k* is disposed overlaps the rotational axis 90C of the rotary body 90. That is, it can be said that the toner cartridge 70*k* held by the cartridge holding portion 81*k* of the tray 80*k* overlaps (FIG. 4B) the rotational axis 90C of the rotary body 90.

In the movement direction Dm of the tray 80*m*, a range in which the tray 80*m* is disposed is arranged to be shifted so as not to overlap the range in which the tray 80*y* is disposed and the range in which the tray 80*c* is disposed. Further, in the movement direction Dy of the tray 80*y*, the range in which the tray 80*y* is disposed is arranged to be shifted so as not to overlap the range in which the tray 80*m* is disposed and the range in which the tray 80*k* is disposed. Similarly, in a movement direction Dc of the tray 80*c*, the range in which the tray 80*c* is disposed is arranged to be shifted so as not to overlap the range in which the tray 80*m* is disposed and the range in which the tray 80*k* is disposed.

The positional relationship of the trays 80 can be described as follows. When viewed in the movement direction Dy of the tray 80*y*, the tray 80*y* and the tray 80*k* overlap each other while the tray 80*y* and the tray 80*m* do not overlap each other. When viewed in the movement direction Dm of the tray 80*m*, the tray 80*m* and the tray 80*k* overlap each other while the tray 80*m* does not overlap the trays 80*y* and 80*c*. When viewed in the movement direction Dc of the tray 80*c*, the tray 80*c* and the tray 80*k* overlap each other while the tray 80*c* and the tray 80*m* do not overlap each other.

Here, a situation in which two elements (members, components, units, or the like) overlap each other when viewed in a specific direction denotes a situation in which, when the elements are perpendicularly projected onto an imaginary plane perpendicular to the specific direction, a projected region of one of the elements and a projected region of the other one of the elements overlap each other at least partially.

As illustrated in FIG. 8 and FIG. 10, in the direction (Y-direction) along the rotational axis 90C, a range in which the rack portion 83*m* and the guided portion 82*m* are disposed and a range in which the rack portion 83*k* and the guided portion 82*k* are disposed overlap each other at least partially. That is, in the present embodiment, a range in which the first rack gear (rack portion 83*k*) is disposed and a range in which the second rack gear (rack portion 83*m*) is disposed overlap each other at least partially in the rotary rotational axis direction (Y-direction) of the rotary. Therefore, compared with an arrangement in which the rack portion 83*m* and the guided portion 82*m* do not overlap the rack portion 83*k* and the guided portion 82*k*, the rack portions 83*m* and 83*k* and the guided portions 82*m* and 82*k* can be disposed in a reduced space in the Y-direction.

In the direction (Y-direction) along the rotational axis 90C, a range in which the rack portion 83*y* and the guided portion 82*y* are disposed and a range in which the rack portion 83*c* and the guided portion 82*c* are disposed overlap each other at least partially. That is, in the present embodiment, a range in which a third rack gear (rack portion 83*y*) is disposed and a range in which a fourth rack gear (rack portion 83*c*) is disposed overlap each other at least partially in the rotational axis direction (Y-direction) of the rotary. Therefore, compared with an arrangement in which the rack portion 83*y* and the guided portion 82*y* do not overlap the rack portion 83*c* and the guided portion 82*c*, the rack portions 83*y* and 83*c* and the guided portions 82*y* and 82*c* can be disposed in a reduced space in the Y-direction.

Here, with reference to FIG. 10, a meshing position between the rack portion 83 and the pinion gear 94 will be described. The upper half part of FIG. 10 illustrates the meshing position between the rack portion 83*k* and the pinion gear 94*k*. The lower half part of FIG. 10 illustrates the meshing position between the rack portion 83*y* and the pinion gear 94*y*.

In a region Y1 in FIG. 10, a driving force transmitted by the transmission device (described later) from the motor M2 (FIG. 2) as a driving source is transmitted to the pinion gears 94*y* to 94*k* in the direction (Y-direction) along the rotational axis 90C of the rotary body 90. In the Y-direction, the pinion gear 94*k* meshes with the rack portion 83*k* in a region Y2 in FIG. 10 such that drive transmission is enabled. In a region Y3 in FIG. 10, the pinion gear 94*y* meshes with the rack portion 83*y* in the Y-direction such that drive transmission is enabled. Similarly to the rack portion 83*k*, the rack portion 83*m* meshes in the region Y2 with the pinion gear 94*m* (FIG. 8) such that drive transmission is enabled. Similarly to the rack portion 83*y*, the rack portion 83*c* meshes in the region Y3 with the pinion gear 94*c* (FIG. 8) such that drive transmission is enabled.

Here, the region Y2 and the region Y3 are present at different positions (shifted from each other in the Y-direction) in the Y-direction. The region Y1 is present at a position that differs from each of the position of the region Y2 and the position of the region Y3 in the Y-direction. That is, the region Y1 is shifted from the region Y2 and the region Y3 in the Y-direction.

Further, in a state in which each of the toner cartridges 70*y* and 70*c* is at the mount position, a range in which the rack portion 83*y* is disposed and a range in which the rack portion 83*c* is disposed overlap each other at least partially in the movement direction (the movement direction Dy of the tray 80*y*) of the rack portion 83*y*. Since the movement direction Dy of the tray 80*y* and the movement direction Dc of the tray 80*c* are substantially identical (parallel) to each other in the present embodiment, the range in which the rack portion 83*y* is disposed and the range in which the rack portion 83*c* is disposed overlap each other at least partially also in the movement direction Dc of the tray 80*c*. Therefore, in a state in which each of the toner cartridges 70*y* and 70*c* is at the mount position, the tooth surface of the rack portion 83*y* and the tooth surface of the rack portion 83*c* face each other in a direction (left-right direction in FIG. 8) orthogonal to the movement direction Dy of the rack portion 83*y* and the movement direction Dc of the rack portion 83*c*.

Further, in a state in which each of the toner cartridges 70*m* and 70*k* is at the mount position, a range in which the rack portion 83*m* is disposed and a range in which the rack portion 83*k* is disposed overlap each other at least partially in the movement direction (the movement direction Dm of the tray 80*m*) of the rack portion 83*m*. Since the movement direction Dm of the tray 80*m* and the movement direction Dk of the tray 80*k* are substantially identical (parallel) to each other in the present embodiment, the range in which the rack portion 83*m* is disposed and the range in which the rack portion 83*k* is disposed overlap each other at least partially also in the movement direction Dk of the tray 80*k*. Therefore, in the state in which each of the toner cartridges 70*m* and 70*k* is at the mount position, the tooth surface of the rack portion 83*m* and the tooth surface of the rack portion 83*k* face each other in a direction (up-down direction in FIG. 8) orthogonal to the movement direction Dm of the rack portion 83*m* and the movement direction Dk of the rack portion 83*k*.

In addition, when viewed in the direction (Y-direction) along the rotational axis 90C, the rack portion 83*y* overlaps the rack portion 83*m* and the rack portion 83*k*. When viewed in the direction (Y-direction) along the rotational axis 90C, the rack portion 83*m* overlaps the rack portion 83*y* and the rack portion 83*c*. When viewed in the direction (Y-direction) along the rotational axis 90C, the rack portion 83*c* overlaps the rack portion 83*m* and the rack portion 83*k*. When viewed in the direction (Y-direction) along the rotational axis 90C, the rack portion 83*k* overlaps the rack portion 83*y* and the rack portion 83*c*. In other words, the range in which the first rack gear (rack portion 83*k*) is disposed and a range in which the second rack gear (rack portion 83*y*) is disposed do not overlap each other in the rotational axis direction (Y-direction) of the rotary. In addition, in a state in which the first toner cartridge 70*k* is at the first mount position while the second toner cartridge 70*y* is at the second mount position, the first rack gear (rack portion 83*k*) and the second rack gear (rack portion 83*y*) overlap each other when viewed in the rotational axis direction (Y-direction) of the rotary.

Since, as described above, the position in which each of the rack portions 83*k* and 83*m* is disposed and the position in which each of the rack portions 83*y* and 83*c* is disposed are different from each other in the Y-direction, it is possible to dispose the rack portions 83*m* and 83*k* so as to overlap the rack portions 83*y* and 83*c* when viewed in the Y-direction.

Consequently, it is possible to address space saving in the arrangement of the four trays in the rotary body 90 and achieve size reduction of the rotary body 90 in the turning radius direction. That is, if it is attempted to dispose the rack portions 83 so as not to overlap each other when viewed in the Y-direction while setting the movement distance of each of the trays 80*y* to 80*k* to be similar to that in the present embodiment, an area required for arranging the four rack portions when viewed in the Y-direction increases. Compared with such a configuration, it is possible to reduce the arrangement area of the rack portions 83 when viewed in the Y-direction by disposing the plurality of rack portions 83 such that the positions thereof in the Y-direction are shifted from each other while disposing the rack portions 83 so as to overlap each other when viewed in the Y-direction.

In addition, in the present embodiment, the four rack portions 83*y* to 83*k* are divided in two sets each including two of the rack portions, and the two sets are disposed such that the positions thereof are shifted from each other in the Y-direction. That is, in the rotational axis direction (Y-direction) of the rotary, a range in which the first rack gear is disposed and a range in which the second rack gear is disposed overlap each other, and a range in which the third rack gear is disposed and a range in which the fourth rack gear is disposed overlap each other. In addition, in the Y-direction, the range in which the first rack gear is disposed and the range in which the second rack gear is disposed are arranged not to overlap the range in which the third rack gear is disposed and the range in which the fourth rack gear is disposed. Consequently, compared with when the positions of the four rack portions 83*y* to 83*k* are shifted from each other in the Y-direction, the size of the rotary body 90 can be reduced in the Y-direction.

Configuration of Movement of Trays

Figure 11A:
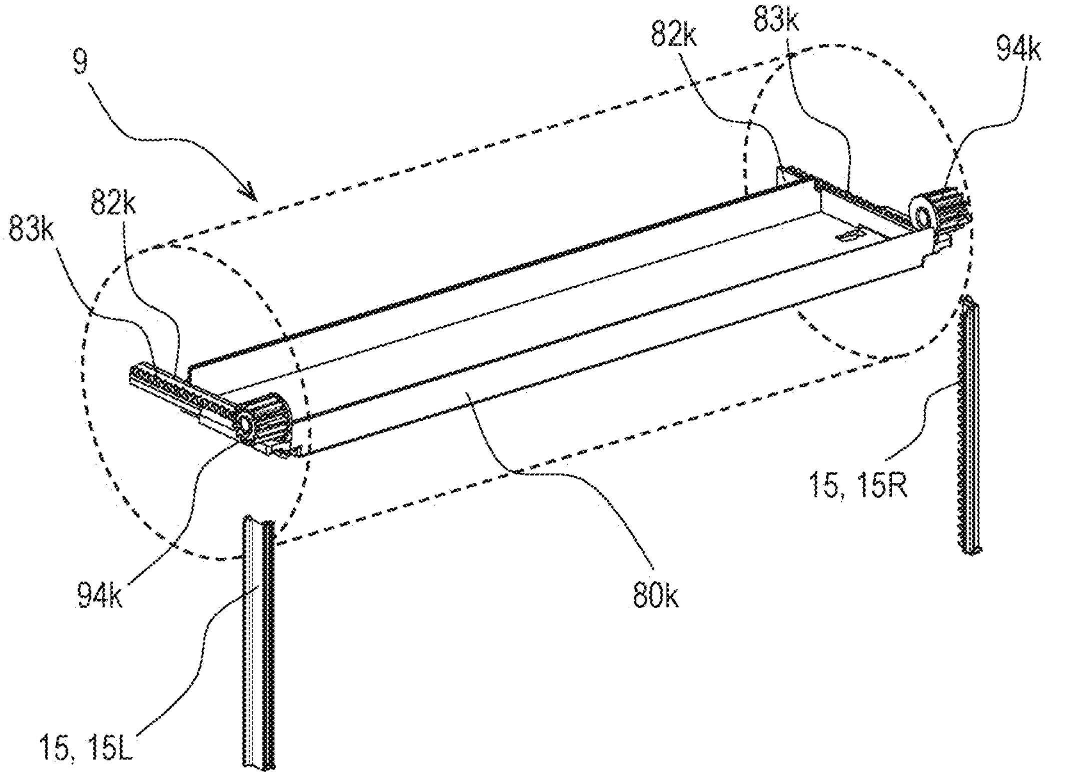
FIGS. 11A and 11B are explanatory views of a configuration relating to the movement of the tray according to the first embodiment.
Figure 11B:
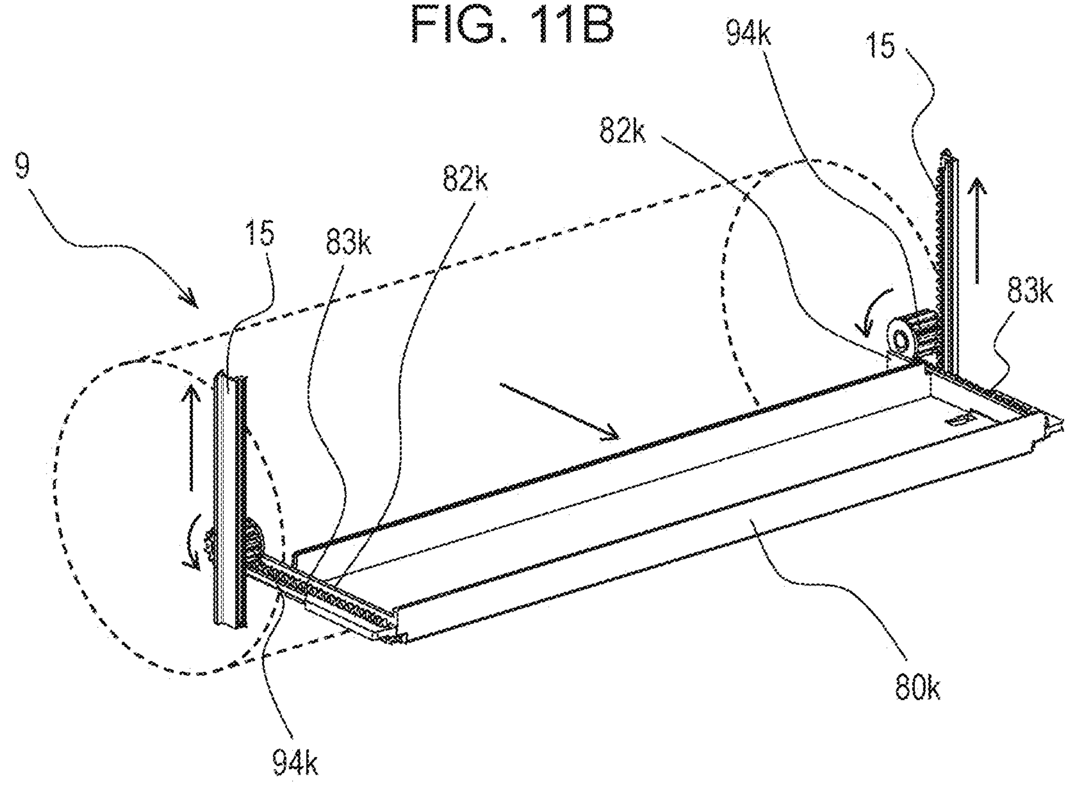
Figure 12A:
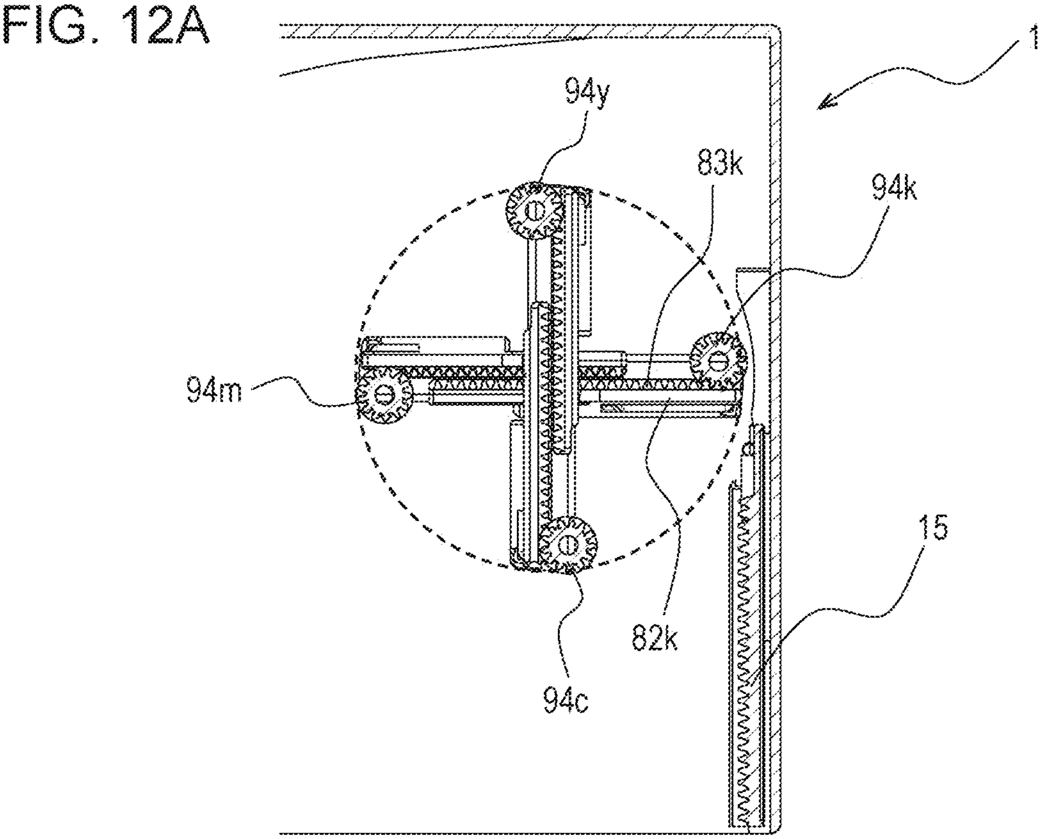
FIGS. 12A and 12B are explanatory views of a configuration relating to the movement of the tray according to the first embodiment.
Figure 12B:
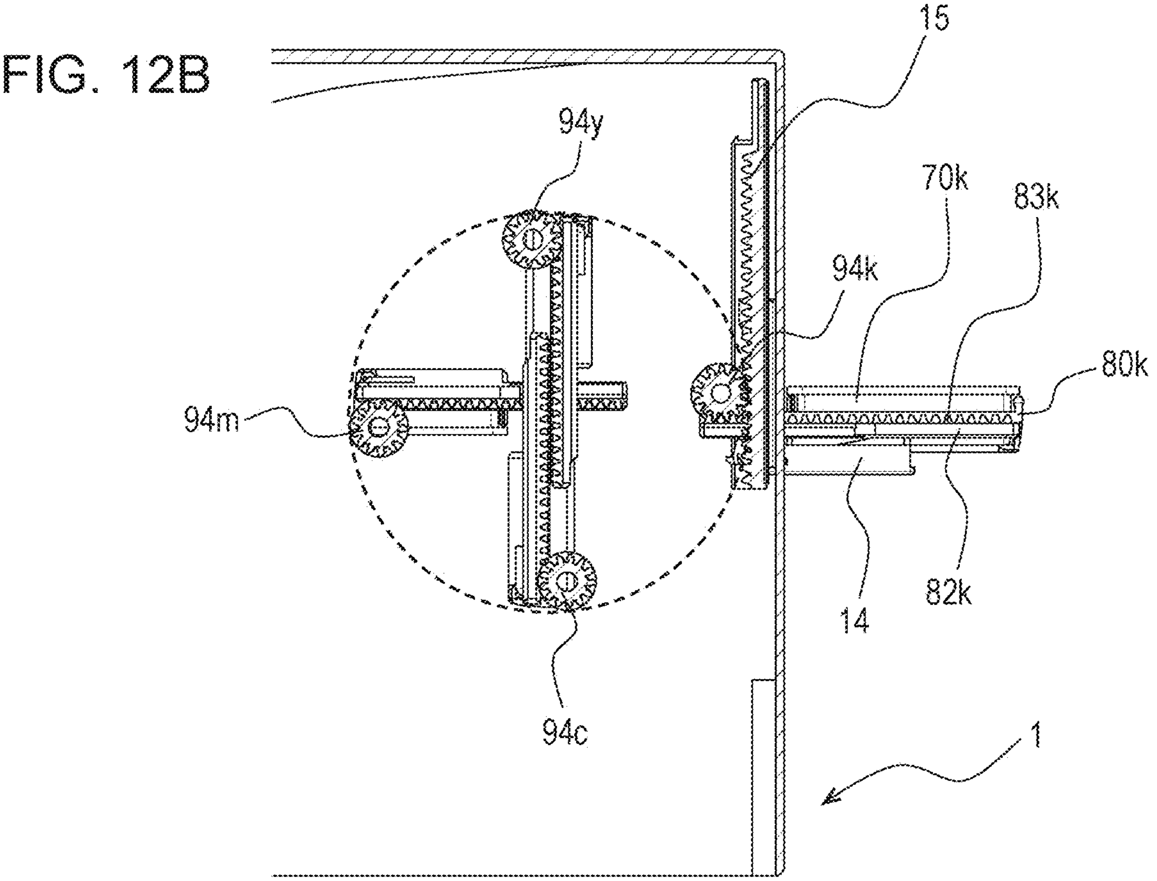

With reference to FIGS. 11A and 11B and FIGS. 12A and 12B, a configuration relating to the movement of the trays 80*y* to 80*k* disposed in the rotary body 90 will be described. FIGS. 11A and 11B are perspective views each illustrating a configuration relating to the movement of the tray 80*k*. FIGS. 12A and 12B are sectional views each illustrating a configuration of the movement of the tray 80*k*.

In the present embodiment, the trays 80*y* to 80*k* are each driven by the driving force of the motor M2 being transmitted to the pinion gears 94*y* to 94*k* by the drive racks 15L and 15R as transmission devices. Here, a configuration for moving the tray 80*k* with respect to the rotary body 90 will be described, and description of configurations for moving the trays 80$y$ to 70$c$ with respect to the rotary body 90 is omitted since the configurations are substantially the same as the configuration for moving the tray 80$k$.

FIG. 11A illustrates a state in which the tray 80$k$ is inside the rotary body 90 (that is, a state in which the toner cartridge 70$k$ is mounted on the developing unit 50$k$). That is, FIG. 11A illustrates a state in which the tray 80$k$ is at the accommodation position, and the state corresponds to a state in which the toner cartridge 70$k$ is at the mount position with respect to the development frame body 53$k$ (FIG. 4A). FIG. 11B illustrates a state in which the tray 80$k$ has been moved by sliding to the outside of the rotary body 90. That is, FIG. 11B illustrates a state in which the tray 80$k$ is at the removal position, and the state corresponds to a state in which the toner cartridge 70$k$ is at the retraction position with respect to the development frame body 53$k$ (FIG. 4B).

The apparatus body 1A in the present embodiment includes the drive racks 15L and 15R as drive gears that drive the pinion gear 94. Each drive rack 15 is driven by the motor M2 via the drive transmitting mechanism (not illustrated).

As described above, two rack portions 83$k$ are formed one each at two end portions of the tray 80$k$ in the Y-direction. At the two end portions, two pinion gears 94$k$ and the two drive racks 15L and 15R are disposed at positions corresponding to the rack portions 83$k$. The drive rack 15L is an example of a first drive gear. The drive rack 15R is an example of a second drive gear. The drive racks 15L and 15R are collectively referred to as "drive rack 15" when distinguishment between the drive racks 15L and 15R is not required.

That is, the rack portion 83 in the present embodiment is configured as a rack gear pair, and the pinion gear 94 in the present embodiment is configured as a pinion gear pair. The rack gear pair and the pinion gear pair in the present embodiment are each disposed on one end side and the other end side of the support member (tray 80) in the Y-direction but may be disposed at other positions. The rack portion 83$k$ and the pinion gear 94$k$ of the moving device 85$k$ corresponding to the tray 80$k$ are an example of a first rack gear pair and an example of a first pinion gear pair, respectively.

The rack portions 83$y$ to 83$c$ and the pinion gears 94$y$ to 94$c$ of the moving device 85$y$ to 85$c$ corresponding to the other trays 80$y$ to 80$c$ are examples of a second rack gear pair and examples of a second pinion gear pair, respectively.

One rack gear of the rack gear pair meshes with one pinion gear of the pinion gear pair, and the other rack gear of the rack gear pair meshes with the other pinion gear of the pinion gear pair. At least one pinion gear of the pinion gear pair is driven by the drive rack 15L as a first drive rack. In the present embodiment, both pinion gears of the pinion gear pair are simultaneously driven by the drive racks 15L and 15R as the first drive rack and a second drive rack. Consequently, the tray 80 does not easily rotate, which makes it possible to move the toner cartridge 70 stably.

A driving force may be input to only one pinion gear of the pinion gear pair by using only the first drive rack. In this case, for example, with the pinion gear pair being coupled by a shaft or the like, drive may be transmitted from one pinion gear of the pinion gear pair that receives a driving force from the first drive rack to the other pinion gear of the pinion gear pair. In this configuration, the second drive rack and a configuration for moving the second drive rack can be omitted, and it is thus possible to address a size reduction and simplification of the apparatus.

The tray 80$k$ is held to be movable with respect to the rotary body 90 by sliding in a direction (that is, the movement direction Dk) parallel to the guided portion 82$k$. The drive rack 15 is held to be movable with respect to the apparatus body 1A by sliding in a direction intersecting the movement direction Dk of the tray 80$k$. The drive rack 15 is configured to move (reciprocate) with respect to the apparatus body 1A by sliding in a first direction (vertically upward in the present embodiment) and a second direction (vertically downward) opposite to the first direction. That is, the movement direction of the drive rack 15 in the present embodiment is a direction orthogonal to both the movement direction Dk of the tray 80$k$ and the direction (Y-direction) along the rotational axis 90C of the rotary body 90.

With reference to FIGS. 11A and 11B, a tray insertion/pulling-out operation in which the tray 80$k$ is moved to slide between the accommodation position and the removal position will be described. The tray insertion/pulling-out operation of the tray 80$k$ is performed by the motor M2 (FIG. 2), the drive transmitting mechanism (not illustrated), the drive rack 15, the pinion gear 94$k$, and the rack portion 83$k$.

First, the tray insertion/pulling-out operation (tray pulling-out operation) to detach the toner cartridge 70$k$ from the rotary body 90 will be described. In a state before the tray pulling-out operation is started, the drive rack 15 is located below a position to mesh with the pinion gear 94$k$ (FIG. 11A). In addition, as described above, the rotary body 90 is in the replacement orientation (FIG. 4B) for the toner cartridge 70$k$ in a replacement operation of the toner cartridge 70$k$.

When the tray pulling-out operation is started, the drive rack 15 is moved to slide upward in the apparatus body 1A by the driving force of the motor M2. In the process of being moved, the drive rack 15 meshes with the pinion gear 94$k$, and the pinion gear 94$k$ is driven to rotate.

As illustrated in FIG. 11B, as a result of the pinion gear 94$k$ being driven to rotate in the arrow direction in FIG. 11B, the rack portion 83$k$ that meshes with the pinion gear 94$k$ receives the driving force. Consequently, the tray 80$k$ is pushed to the apparatus-outside and moved from the accommodation position to the removal position with respect to the rotary body 90. The movement direction of the tray 80$k$ at this time is guided to be in the predetermined movement direction Dk by the engagement between the guided portion 82$k$ and the guide portion 97$k$ (FIG. 7A) of the rotary body 90. As a result of the tray 80$k$ moving from the accommodation position to the removal position, the toner cartridge 70$k$ is moved from the mount position to the retraction position with respect to the developing unit 50$k$.

In a state in which the tray 80$k$ is located at the removal position and in which the toner cartridge 70$k$ is located at the retraction position, a user can attach and detach the toner cartridge 70$k$ to and from the tray 80$k$.

The tray insertion/pulling-out operation (tray insertion operation) to attach the toner cartridge 70 to the rotary body 90 is performed in a process opposite the tray pulling-out operation. In a state before the tray insertion operation is started, the drive rack 15 is located above a position to mesh with the pinion gear 94$k$. When the operation is started, the drive rack 15 is moved to slide downward in the apparatus body 1A by the driving force of the motor M2. Here, the rotation direction of the motor M2 in the tray insertion operation is opposite to that in the tray pulling-out operation. In the process of being moved, the drive rack 15 meshes with the pinion gear 94$k$, and the pinion gear 94$k$ is driven to rotate.

As a result of the pinion gear 94*k* being driven to rotate in a direction opposite to the arrow direction in FIG. 11B, the rack portion 83*k* that meshes with the pinion gear 94*k* receives the driving force. Consequently, the tray 80*k* is inserted into the apparatus and moved from the removal position to the accommodation position with respect to the rotary body 90.

The movement direction of the tray 80*k* is guided to be in the movement direction Dk (the direction opposite to the arrow direction in FIG. 11B) by the engagement between the guided portion 82*k* and the guide portion 97*k* (FIG. 7A) of the rotary body 90. As a result of the tray 80*k* moving from the removal position to the accommodation position, the toner cartridge 70*k* is moved from the retraction position to the mount position with respect to the developing unit 50*k*.

The movement of the tray 80*k* and the toner cartridge 70*k* for black has been described above. The movement of the other trays 80*y* to 80*c* and the other toner cartridges 70*y* to 70*c* is also performed by the same mechanism. That is, in the replacement orientation of each of the toner cartridges, the drive rack 15 transmits drive to the pinion gears 94*y* to 94*c*.

The motor M2, which is provided in the apparatus body 1A, and the transmission device, which includes the drive rack 15 (15L and 15R) and the drive transmitting mechanism, constitute the driving device 98 for driving the moving device 85 provided in the rotary body 90.

As described above, the plurality of moving devices 85*k* to 85*y* corresponding to the plurality of toner cartridges 70*y* to 70*k* are disposed in the rotary body 90 in the present embodiment. The driving device 98 of the apparatus body 1A is a common driving device that drives the plurality of moving devices 85*k* to 85*y* (a plurality of driven devices) of the rotary body 90.

In the present embodiment, a rotation of the rotary body 90 switches a driving target of the driving device 98. In other words, the driving device in the present embodiment includes the drive rack 15 as a transmitting member that transmits a driving force of a driving source. The driving device can be in a state in which the transmitting member engages with the first driven portion (pinion gear 94*k*) such that drive transmission is enabled and a state in which the transmitting member engages with the second driven portion (pinion gear 94*m*) such that drive transmission is enabled. The driving device also can be in a state in which the transmitting member separates from the first driven portion and the second driven portion.

As described above, the pinion gears 94*y* to 94*k* are held by the rotary body 90. Therefore, meshing of the drive rack 15 with the pinion gears 94*y* to 94*k* can be released while the rotary body 90 rotates.

FIG. 12A illustrates a state in which the tray 80*k* is located inside the rotary body 90 (a state in which the tray 80*k* is at the accommodation position). FIG. 12B illustrates a state in which the tray 80*k* has moved to the outside of the rotary body 90 (a state in which the tray 80*k* has moved to the removal position).

As illustrated in FIG. 12A, when the tray 80*k* is located inside the rotary body 90, the drive rack 15 is located at a lower portion inside the apparatus body 1A. At this time, the drive rack 15 is retracted from the pinion gear 94*k*. Therefore, the rotary body 90 can be rotated without interference of the drive rack 15. More specifically, the drive rack 15 can retract to the outside of the rotational trajectory of the rotary body 90 indicated by the dotted line in each of FIG. 12A and FIG. 12B.

By driving the motor M2 to rotate in the forward and reverse directions as described above, it is possible to move the tray 80 attached to the rotary body 90 from the accommodation position to the removal position or from the removal position to the accommodation position with respect to the rotary body 90. That is, not only being capable of driving each moving device of the rotary such that the toner cartridge moves from the mount position to the retraction position, the driving device in the present embodiment is capable of driving each moving device such that the toner cartridge moves from the retraction position to the mount position.

Here, as described above, the movement amount of the tray 80 in toner cartridge replacement is varied in accordance with the size of the toner cartridge 70 in the present embodiment. Specifically, as illustrated in FIGS. 7A and 7B, the movement distance L1 when the tray 80*k* for black moves from the accommodation position to the removal position is longer than the movement distance L2 when each of the trays 80*y* to 80*c* moves from the accommodation position to the removal position.

Therefore, in moving each of the toner cartridges 70*y* to 70*k* from the mount position to the retraction position, a value obtained by dividing a speed of the rack portion 83*k* by a speed of the drive rack 15 is greater than a value obtained by dividing a speed of each of the rack portions 83*y* to 83*c* by the speed of the drive rack 15 in the present embodiment.

For example, as illustrated in FIG. 10, a step gear is used as the pinion gear 94*y*, and a pitch circle radius of a small-diameter gear 942 that meshes with the rack portion 83*y* is set to be smaller than a pitch circle radius of a large-diameter gear 941 that meshes with the drive rack 15. Similar step gears are used as also the pinion gears 94*m* and 94*c*. Meanwhile, the pinion gear 94*k* is configured such that a portion that meshes with the drive rack 15 and a portion that meshes with the rack portion 83*k* have the same pitch circle radius. With this configuration, it is possible, even when the movement distance of the drive rack 15 is the same, to set the movement distance of the rack portion 83*k* to be larger than the movement distance of each of the other rack portions 83*y* to 83*c*. That is, the movement distance L1 when the tray 80*k* for black moves from the accommodation position to the removal position can be set to be longer than the movement distance L2 when each of the other trays 80*y* to 80*c* moves from the accommodation position to the removal position.

In addition, by using step gears as the pinion gears 94*y* to 94*c*, it is possible to set the movement distance L1 of the tray 80*k* to be larger than the movement distance L2 of each of the other trays 80*y* to 80*c* even in a configuration in which the pinion gears 94*y* to 94*k* receive a driving force from the same drive rack 15.

As an alternative to (or in addition to) the configuration in which step gears are used as the pinion gears 94*y* to 94*c*, a configuration in which a step gear is used as the pinion gear 94*k* may be employed. In this case, a small-diameter gear can be used at a portion of the pinion gear 94*k* meshing with the drive rack 15, and a large-diameter gear having a pitch circle radius larger than a pitch circle radius of the small-diameter gear can be used at a portion of the pinion gear 94*k* meshing with the rack portion 83*k*. The step gear is one example of a deceleration mechanism and may be replaced with a known deceleration mechanism that reduces a movement amount of a member of an input side (driving source side) to be smaller than a movement amount of a member of an output side (tray 80 side).

A movement amount of the drive rack 15 when the toner cartridge 70*k* is moved from the mount position to the retraction position may be set to be larger than a movement amount of the drive rack 15 when each of the toner cartridges 70*y* to 70*c* is moved from the mount position to the retraction position.

Meanwhile, when a distance by which the toner cartridge 70 moves from the mount position to the retraction position is short, a moving time of the toner cartridge 70 can be reduced, and a time in which a user waits for the movement of the toner cartridge 70 can be reduced. By employing a configuration in which a movement amount of the drive rack 15 with respect to the toner cartridge 70*k* is larger than a movement amount of the drive rack 15 with respect to each of the toner cartridges 70*y* to 70*c* as described above, it is possible to reduce a time in which a user waits for the movement of each of the toner cartridges 70*y* to 70*c*.

With the above configuration, the movement distance L1 can be set to be longer than the movement distance L2. These configurations can be employed in combination.

Control System

Figure 13:
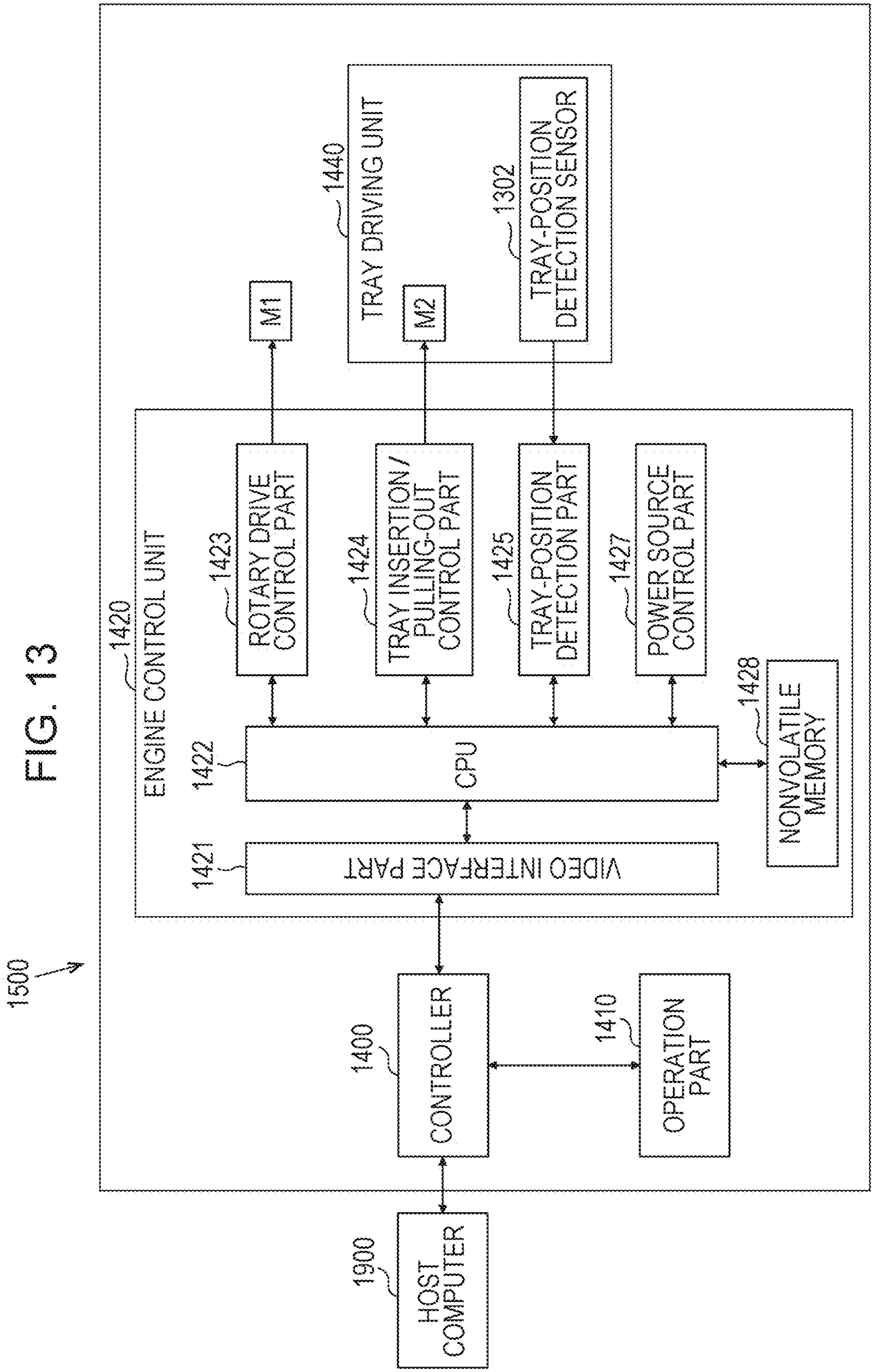
FIG. 13 is a block diagram of a control system according to the first embodiment.

With reference to FIG. 13, a control system 1500 that controls the image forming apparatus 1 in the present embodiment will be described. FIG. 13 is a block diagram of the control system 1500.

The image forming apparatus 1 includes the control system 1500. The control system 1500 includes a controller 1400, an operation part 1410, and an engine control unit 1420. The engine control unit 1420 includes a video interface part 1421, a CPU 1422, and a nonvolatile memory 1428. The CPU 1422 is a central processing unit.

Intercommunication between the controller 1400 and the operation part 1410 is enabled. In addition, intercommunication between the controller 1400 and the engine control unit 1420 is also enabled.

The CPU 1422 controls a tray driving unit 1440 via a rotary drive control part 1423, a tray insertion/pulling-out control part 1424, and a tray position detection part 1425. The CPU 1422 also controls a power source of the image forming apparatus via a power source control part 1427.

The operation part 1410 is capable of receiving a movement instruction for the tray 80 from a user. The operation part 1410 in the present embodiment is an operation button such as that illustrated in FIG. 6. With the operation button being pressed by a user, a signal indicating a movement instruction for the tray 80 is transmitted to the controller 1400. Upon receiving the signal relating to the movement instruction for the tray 80 from the operation part 1410, the controller 1400 transmits a command indicating the moving instruction to the CPU 1422 of the engine control unit 1420 via the video interface part 1421.

Upon receiving the command indicating the movement instruction, the CPU 1422 shifts the rotary body 90 into the replacement orientation by controlling the rotary drive control part 1423. That is, the rotary drive control part 1423 controls the motor M1, thereby performing rotation control of the rotary body 90 described with reference to FIGS. 4A and 4B and shifting the rotary body 90 into the replacement orientation.

Thereafter, the CPU 1422 instructs the tray insertion/pulling-out control part 1424 to start a tray pulling-out operation. The tray insertion/pulling-out control part 1424 performs the tray insertion/pulling-out operation (tray pulling-out operation/tray insertion operation) described with reference to FIGS. 11A and 11B and FIG. 12 by controlling the motor M2 connected to the tray driving unit 1440. That is, the tray insertion/pulling-out control part 1424 controls the movement of the tray 80 by controlling the motor M2.

The tray position detection part 1425 determines the position of the tray 80 by using a detection result of a tray-position detection sensor 1302 (described later). A method of detecting the position of the tray 80 will be described later.

Next, control by the control system 1500 in image formation will be described. Upon receiving print date from a host computer 1900, the controller 1400 expands and converts the print date into image data for forming an image. The controller 1400 generates a video signal on the basis of the image data and instructs the video interface part 1421 of the engine control unit 1420 to start printing. Next, the video interface part 1421 controls the CPU 1422 to start printing. Upon receiving a print instruction, the CPU 1422 executes an image forming operation.

Positional Detection of Tray

Next, a configuration for detecting the position of the tray 80 will be described with reference to FIGS. 14A to 14D and FIGS. 15A to 15D. FIGS. 14A to 14D each illustrate a configuration and control for detecting the position of the tray 80 when the tray 80 moves from the mount position to the retraction position.

Figures 14A, 14B, 14C, 14D:
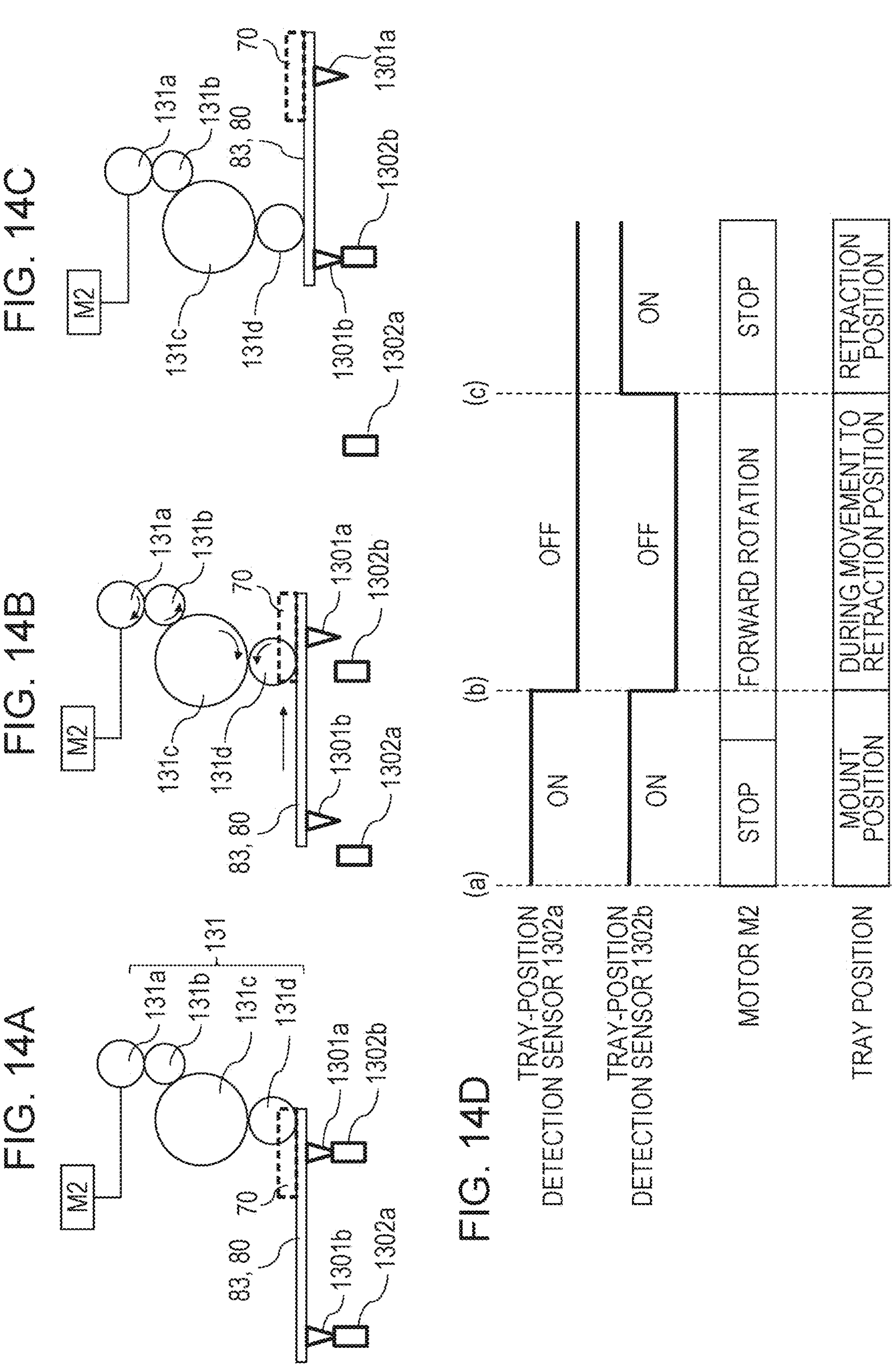
FIGS. 14A, 14B, 14C, and 14D are explanatory views of a configuration relating to positional detection of the tray according to the first embodiment.

FIG. 14A is an explanatory view illustrating a configuration relating to positional detection of the tray 80. As illustrated in FIG. 14A, a gear 131 (131*a*, 131*b*, 131*c*, 131*d*) is connected to the motor M2 as a driving source in the present embodiment. The gear 131*d* is the pinion gear 94. The gear 131 is connected to the rack portion 83 of the tray 80. That is, when the motor M2 is driven, the gear 131 is driven by the motor M2 and moves the tray 80. With such a configuration, the tray 80 supporting the toner cartridge 70 can move between the mount position and the retraction position.

The tray-position detection sensor 1302 is disposed in the vicinity of the tray 80. The tray-position detection sensor 1302 is, for example, a photo interrupter. The tray-position detection sensor 1302 detects the position of the tray 80 and transmits a signal relating to the position of the tray 80 to the tray position detection part 1425 (engine control unit 1420).

The tray-position detection sensor 1302 includes a tray-position detection sensor 1302*a* and a tray-position detection sensor 1302*b*. The tray-position detection sensor 1302*a* and the tray-position detection sensor 1302*b* each include a light emitting element and a light receiving element. Each of the tray-position detection sensors 1302*a* and 1302*b* is, for example, a photo interrupter. The apparatus body 1A also includes sensor flags 1301*a* and 1301*b* that move in conjunction with the movement of the tray 80. When the tray 80 is at the mount position, the tray-position detection sensor 1302*a* detects the sensor flag 1301*b*. When the tray 80 is at the retraction position, the tray-position detection sensor 1302*b* detects the sensor flag 1301*a*.

As described later, the engine control unit 1420 determines that the tray 80 is at the retraction position or the mount position by using information of a signal received from the tray-position detection sensor 1302. The sensor flags 1301*a* and 1301*b* are disposed at a side surface of the tray 80.

With reference to FIGS. 14A to 14D, a method of detecting the position of a tray when the tray 80 moves from the mount position to the retraction position will be described. FIG. 14A is an explanatory view illustrating a state in which the tray 80 is located at the mount position. FIG. 14B is an explanatory view illustrating a state in which the tray 80 is located between the mount position and the retraction position. FIG. 14C is an explanatory view illustrating a state in which the tray 80 is located at the retraction position. FIG.

14D is an explanatory view illustrating a detection state of the tray-position detection sensor 1302, a drive state of the motor M2, and the position of the tray 80 when the tray 80 moves in the order of FIG. 14A, FIG. 14B, and FIG. 14C.

When the tray 80 is located at the mount position as illustrated in FIG. 14A, the sensor flag 1301*a* is at a position at which the sensor flag 1301*a* blocks light that is emitted by the light emitting element of the tray-position detection sensor 1302*b*. The sensor flag 1301*b* is at a position at which the sensor flag 1301*b* blocks light that is emitted by the light emitting element of the tray-position detection sensor 1302*a*. Accordingly, output of both the tray-position detection sensors 1302*a* and 1302*b* is ON. The event in which output of both the tray-position detection sensors 1302*a* and 1302*b* is ON is stored in the nonvolatile memory 1428. The tray position detection part 1425 determines that the tray 80 is located at the mount position by using an output result of the tray-position detection sensor 1302. More specifically, the tray position detection part 1425 determines that the tray 80 is located at the mount position on the basis of that output of both the tray-position detection sensors 1302*a* and 1302*b* is ON.

Next, when the CPU 1422 receives a movement instruction via the operation part 1410, the CPU 1422 controls the tray insertion/pulling-out control part 1424. Then, the tray insertion/pulling-out control part 1424 drives the motor M2 to rotate clockwise (forward rotation) and start a tray pulling-out operation. As a result, the tray 80 at the mount position moves toward the retraction position, and the tray 80 eventually reaches the retraction position.

At an intermediate point during the movement of the tray 80 moving from the mount position toward the retraction position, the sensor flags 1301*a* and 1301*b* are each located at a position (FIG. 14B) at which the light emitted by the light emitting element of the tray-position detection sensor 1302 is not blocked by the sensor flags 1301*a* and 1301*b*. Therefore, output of each of the tray-position detection sensors 1302*a* and 1302*b* changes from ON to OFF. The event in which output of both the tray-position detection sensors 1302*a* and 1302*b* has changed from ON to OFF is stored in the nonvolatile memory 1428. The tray position detection part 1425 determines that the tray 80 is located between the mount position and the retraction position by using an output result of the tray-position detection sensor 1302. More specifically, the tray position detection part 1425 determines that the tray 80 is located between the mount position and the retraction position on the basis of that output of both the tray-position detection sensors 1302*a* and 1302*b* is OFF.

As illustrated in FIG. 14C, when the tray 80 arrives at the retraction position, the sensor flag 1301*a* is at a position at which the sensor flag 1301*a* does not block the light emitted by the light emitting element of the tray-position detection sensor 1302. Meanwhile, when the tray 80 arrives at the retraction position, the sensor flag 1301*b* is at a position at which the sensor flag 1301*b* blocks the light emitted by the light emitting element of the tray-position detection sensor 1302*b*. Accordingly, output of the tray-position detection sensor 1302*b* changes from OFF to ON. The event in which output of the tray-position detection sensor 1302*a* is OFF and in which output of the tray-position detection sensor 1302*b* is ON is stored in the nonvolatile memory 1428. The tray position detection part 1425 determines that the tray 80 is located at the retraction position by using an output result of the tray-position detection sensor 1302. More specifically, the tray position detection part 1425 determines that the tray 80 is located at the retraction position on the basis of that output of the tray-position detection sensor 1302*a* is OFF while output of the tray-position detection sensor 1302*b* is ON.

Figure 15A:
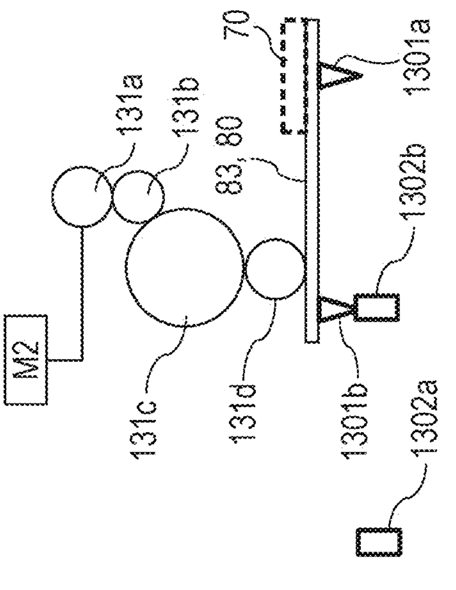
FIGS. 15A, 15B, 15C, and 15D are explanatory views of a configuration relating to positional detection of the tray according to the first embodiment.
Figure 15B:
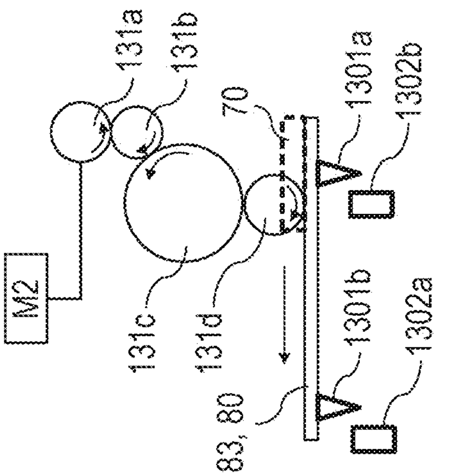
Figure 15C:
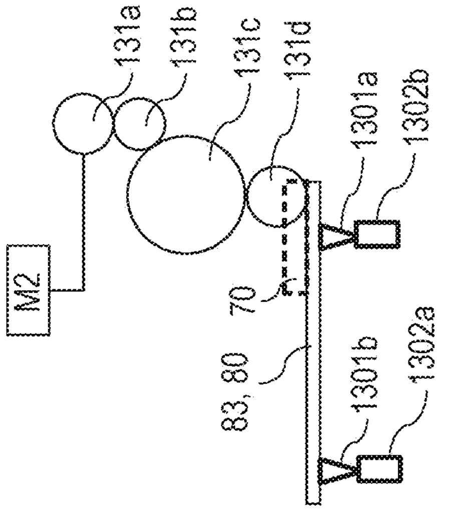
Figure 15D:
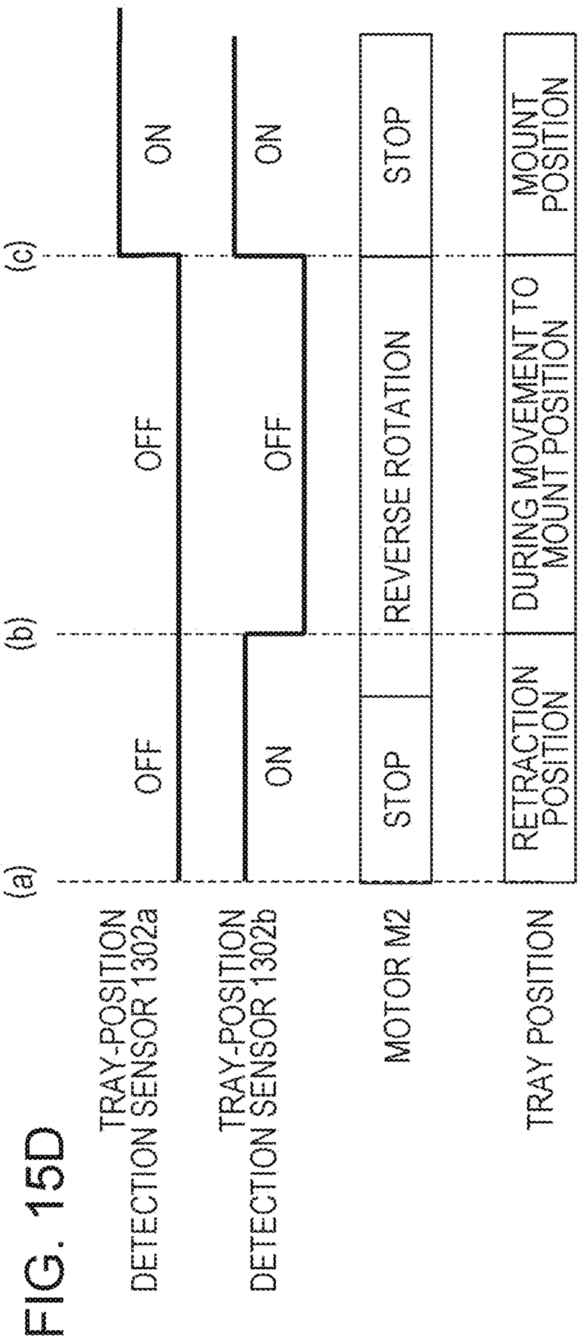

FIGS. 15A, 15B, 15C, and 15D each illustrate a configuration and control for detecting the position of the tray 80 when the tray 80 moves from the retraction position to the mount position. FIG. 15A is an explanatory view illustrating a state in which the tray 80 is located at the retraction position. FIG. 15B is an explanatory view illustrating a state in which the tray 80 is located at a position between the mount position and the retraction position. FIG. 15C is an explanatory view illustrating a state in which the tray 80 is located at the mount position. FIG. 15D is an explanatory view illustrating a detection state of the tray-position detection sensor 1302, a drive state of the motor M2, and the position of the tray 80 when the tray 80 moves in the order of FIG. 15A, FIG. 15B, and FIG. 15C.

When the tray 80 is located at the retraction position as illustrated in FIG. 15A, the sensor flag 1301*b* is at a position at which the sensor flag 1301*b* blocks the light that is emitted by the light emitting element of the tray-position detection sensor 1302*b*. Meanwhile, the sensor flag 1301*a* is not at a position at which the sensor flag 1301*a* blocks the light that is emitted by the light emitting element of the tray-position detection sensor 1302. Accordingly, output of the tray-position detection sensor 1302*b* is ON. Meanwhile, output of the tray-position detection sensor 1302*a* is OFF. The event in which output of the tray-position detection sensor 1302*b* is ON and in which output of the tray-position detection sensor 1302*a* is OFF is stored in the nonvolatile memory 1428. The tray position detection part 1425 determines that the tray 80 is located at the retraction position by using an output result of the tray-position detection sensor 1302. More specifically, the tray position detection part 1425 determines that the tray 80 is located at the retraction position on the basis of that output of the tray-position detection sensor 1302*a* is OFF while output of the tray-position detection sensor 1302*b* is ON.

Next, when the CPU 1422 receives a movement instruction via the operation part 1410, the CPU 1422 controls the tray insertion/pulling-out control part 1424. Then, the tray insertion/pulling-out control part 1424 drives the motor M2 to rotate counterclockwise (reverse rotation) and start a tray insertion operation.

As a result, the tray 80 at the retraction position moves toward the mount position, and the tray 80 eventually reaches the mount position.

At an intermediate point during the movement of the tray 80 from the retraction position toward the mount position, the sensor flags 1301*a* and 1301*b* are each located at a position (FIG. 15B) at which the sensor flags 1301*a* and 1301*b* do not block the light emitted by the light emitting element of the tray-position detection sensor 1302. Therefore, output of each of the tray-position detection sensors 1302*a* and 1302*b* is OFF. The event in which output of both the tray-position detection sensors 1302*a* and 1302*b* is OFF is stored in the nonvolatile memory 1428. The tray position detection part 1425 determines that the tray 80 is located between the mount position and the retraction position by using an output result of the tray-position detection sensor 1302. More specifically, the tray position detection part 1425 determines that the tray 80 is located between the mount position and the retraction position on the basis of that outputs of both the tray-position detection sensors 1302*a* and 1302*b* is OFF.

When the tray 80 reaches the mount position as illustrated in FIG. 15C, the sensor flag 1301*a* is at a position at which the sensor flag 1301*a* blocks the light emitted by the light emitting element of the tray-position detection sensor 1302*b*. The sensor flag 1301*b* is at a position at which the sensor flag 1301*b* blocks light that is emitted by the light emitting element of the tray-position detection sensor 1302*a*. Accordingly, output of both the tray-position detection sensors 1302*a* and 1302*b* is ON. The event in which output of both the tray-position detection sensors 1302*a* and 1302*b* is ON is stored in the nonvolatile memory 1428. The tray position detection part 1425 determines that the tray 80 is located at the mount position by using an output result of the tray-position detection sensor 1302. More specifically, the tray position detection part 1425 determines that the tray 80 is located at the mount position on the basis of that output of both the tray-position detection sensors 1302*a* and 1302*b* is ON.

As described above, positional information of the tray is stored in the nonvolatile memory 1428 connected to the CPU 1422. The information stored in the nonvolatile memory 1428 is kept even in a state in which the power source of the image forming apparatus is turned OFF. The CPU 1422 can refer to the positional information of the tray stored in the nonvolatile memory 1428 at any timing, such as at the time of grasping the positional state of the tray while the power source is turned ON.

The sensor flag 1301 can be referred to as a moving member whose position changes with the movement of the tray 80. The sensor flag 1301 is located at a first position (FIG. 14A) when the tray 80 is located at the mount position. The sensor flag 1301 is located at a second position (FIG. 14C) when the tray 80 is located at the mount position. The tray-position detection sensor 1302 detects the sensor flag 1301 when the sensor flag 1301 is located at the first position or the second position. Meanwhile, when the sensor flag 1301 is not at the first position or the second position, the sensor flag 1301 is not detected. An output of the tray-position detection sensor 1302 when the moving member is located at the first position is different from an output thereof when the moving member is located at the second position.

The engine control unit 1420 determines the position of the tray 80 by using a result of detection of the moving member by the tray-position detection sensor 1302.

With the configuration described above, the image forming apparatus 1 can detect the position of the tray 80.

As a method of detecting the position of the tray, a method other than the above-described method may be employed.

Automatic Insertion Operation of Tray

Next, an automatic insertion operation of the tray 80 of the image forming apparatus 1 will be described. For example, the image forming apparatus 1 has a feature of, upon receiving a sleep instruction, starting a tray insertion operation and moving the tray 80 located at the retraction position to the mount position.

First, a sleep state will be described. The image forming apparatus 1 can shift from an image formation state or the standby state to the sleep state. The sleep state is a state in which electric power of an actuator, such as a motor, and a sensor that are used for printing is turned OFF and is a state in which electric power consumption is reduced. The sleep state is a state in which the amount of power consumption is less than in each of the image formation state and the standby state. The engine control unit 1420 of the image forming apparatus 1 shifts to a sleep mode when, for example, a predetermined time has elapsed in the standby state. Consequently, electric power consumption while the image forming apparatus 1 is not used by a user can be reduced.

When the image forming apparatus 1 shifts to the sleep state in a state in which the tray 80 is at the retraction position, there is a possibility that an insertion operation of the tray 80 is not performed by a user for a long time. When the tray 80 is at the retraction position for a long time, there is a possibility that a foreign matter enters the image forming apparatus 1 through the opening 16*a* and causes a malfunction of the image forming apparatus 1. Accordingly, the tray 80 can be moved to the mount position to avoid the tray 80 being located at the retraction position for a long time. Thus, the image forming apparatus 1 performs the automatic insertion operation.

Figure 16:
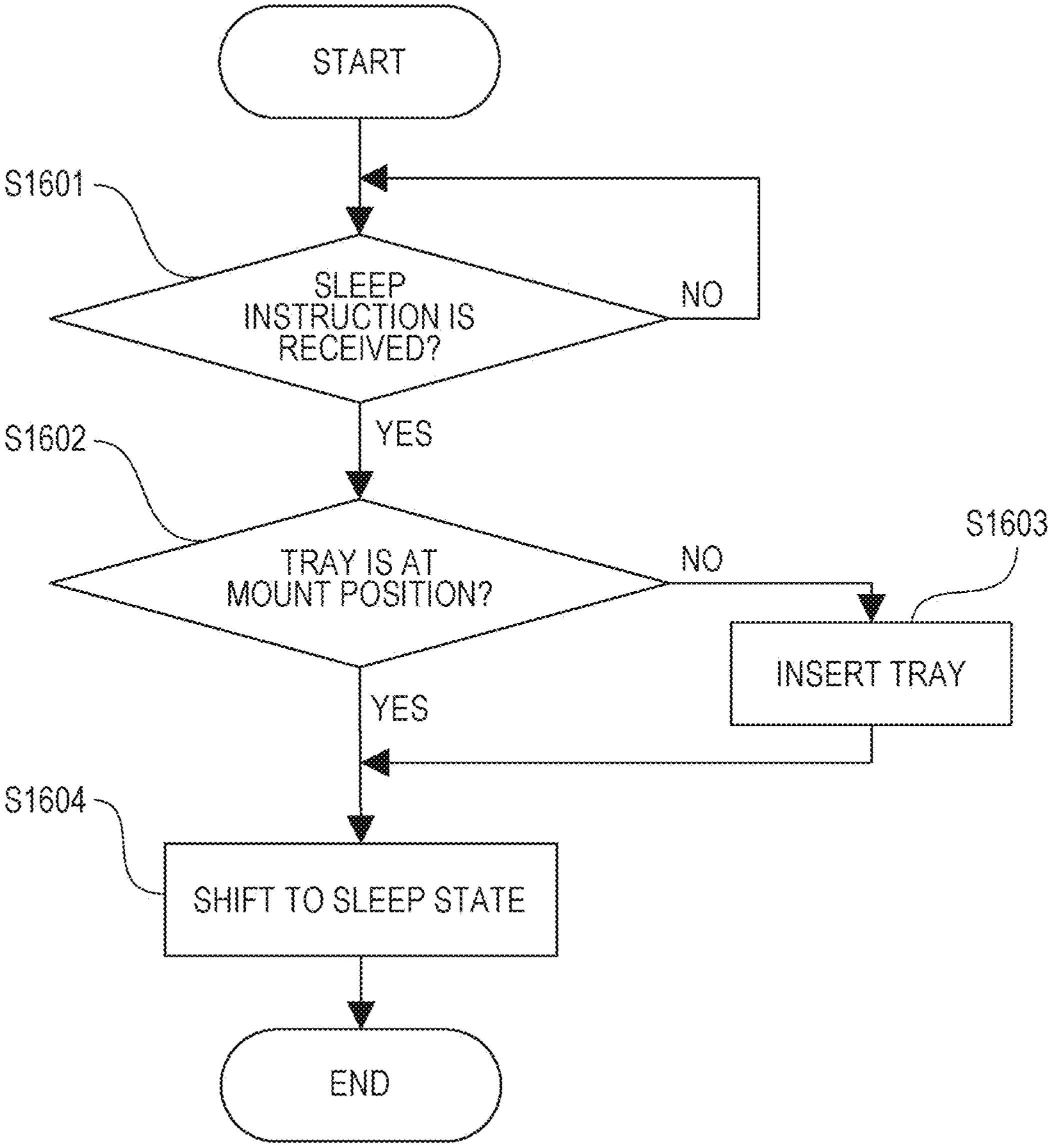
FIG. 16 is a flowchart illustrating control of the image forming apparatus according to the first embodiment.

FIG. 16 is a flowchart illustrating control of the automatic insertion operation when the sleep instruction is received. The engine control unit 1420 confirms whether the sleep instruction has been received from the controller 1400 during the standby state. If the engine control unit 1420 has not received the sleep instruction (S1601: NO), the engine control unit 1420 monitors whether the sleep instruction is received.

If the engine control unit 1420 has received the sleep instruction (S1601: YES), the engine control unit 1420 refers to positional information of the tray stored in the nonvolatile memory 1428 and confirms whether the tray 80 is located at the mount position (S1602).

If the CPU 1422 determines that the tray 80 is not located at the mount position (S1602: NO), the tray insertion/pulling-out control part 1424 performs the tray insertion operation (step S1603).

If it is determined that the tray 80 is located at the mount position (S1602: YES), the power source control part 1427 shifts from the standby state to the sleep state (step S1604). Consequently, the image forming apparatus 1 becomes in the sleep state.

The engine control unit 1420 controls the movement of the tray 80 as described above. Upon receiving the sleep instruction, the engine control unit 1420 shifts the image forming apparatus to the sleep state in which electric power consumption is less than in image formation. When the engine control unit 1420 receives the sleep instruction in a state in which the tray 80 is at the retraction position, the engine control unit 1420 moves the tray 80 from the retraction position to the mount position. Further, after the tray 80 reaches the mount position, the engine control unit 1420 shifts the image forming apparatus 1 to the sleep state. Such a configuration can avoid a situation in which the tray 80 is located at the retraction position for a long time.

Second Embodiment

In the first embodiment, control in which the automatic insertion operation is performed when the sleep instruction is received has been described. In a second embodiment, control in which the automatic insertion operation is performed when the tray 80 is located at the retraction position for a long time will be described. As described also in the first embodiment, a situation in which the tray 80 is located at the retraction position for a long time can be avoided. Thus, the automatic insertion operation is performed in a state in which the tray 80 is located at the retraction position for a long time.

Figure 17:
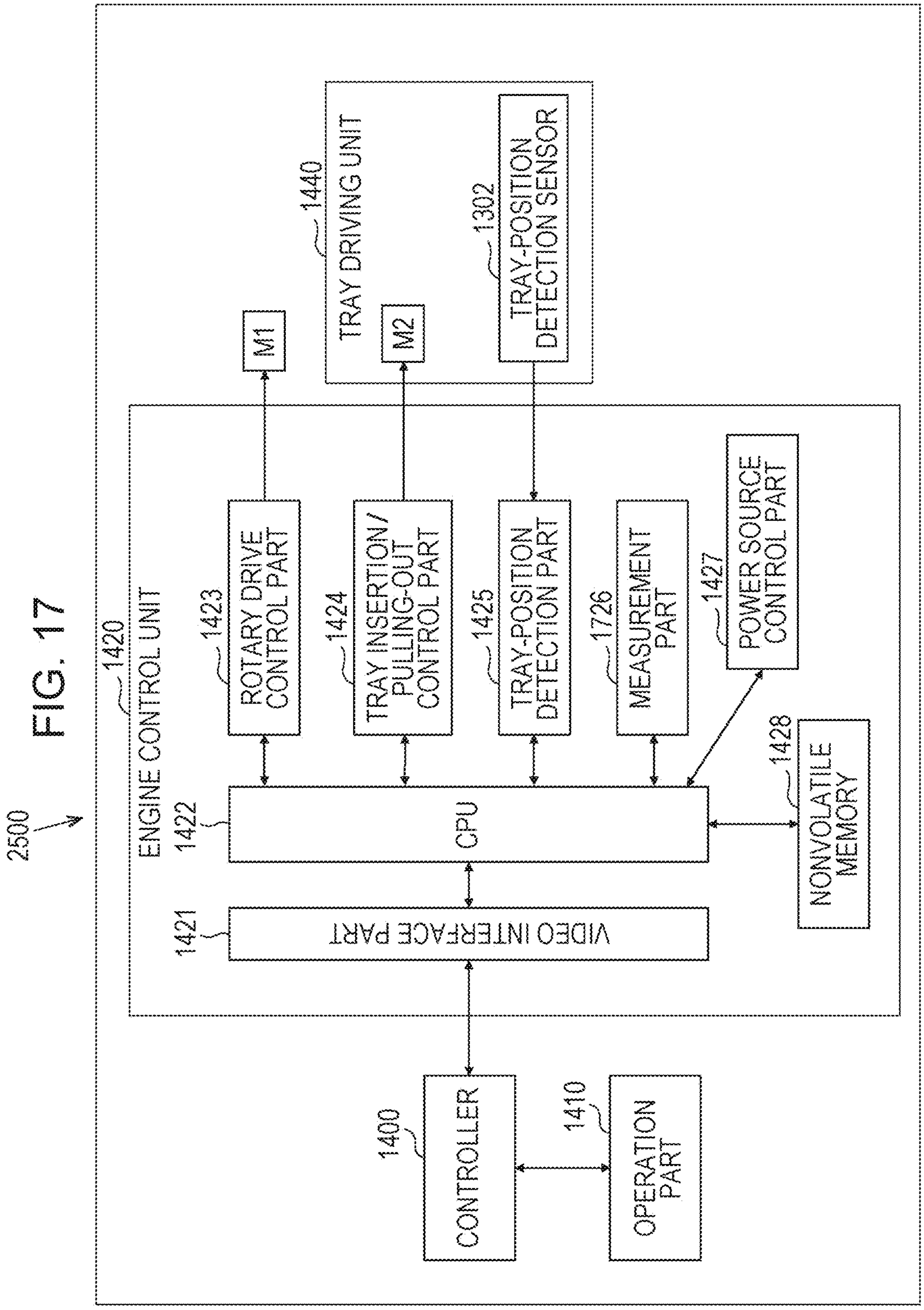
FIG. 17 is a block diagram of a control system according to a second embodiment.

FIG. 17 is a block diagram of a control system 2500 in the second embodiment. The control system 2500 differs only in a feature of including a measurement part 1726 from the control system 1500 in FIG. 13.

The other configurations are the same, and description thereof is thus omitted.

The CPU 1422 detects that the tray 80 is at the retraction position by the same method as that in the above-described first embodiment. When the CPU 1422 detects that the tray 80 is at the retraction position, the CPU 1422 causes the measurement part 1726 to measure the time. More specifically, an elapsed time T that is a time that has elapsed since the tray 80 is located at the retraction position.

When the elapsed time T exceeds a predetermined length of time (threshold) α recorded in the nonvolatile memory 1428, the CPU 1422 controls the movement of the tray 80 such that the tray 80 moves from the retraction position to the mount position. As a result, the tray 80 moves from the retraction position to the mount position and reaches the mount position eventually.

Figure 18:
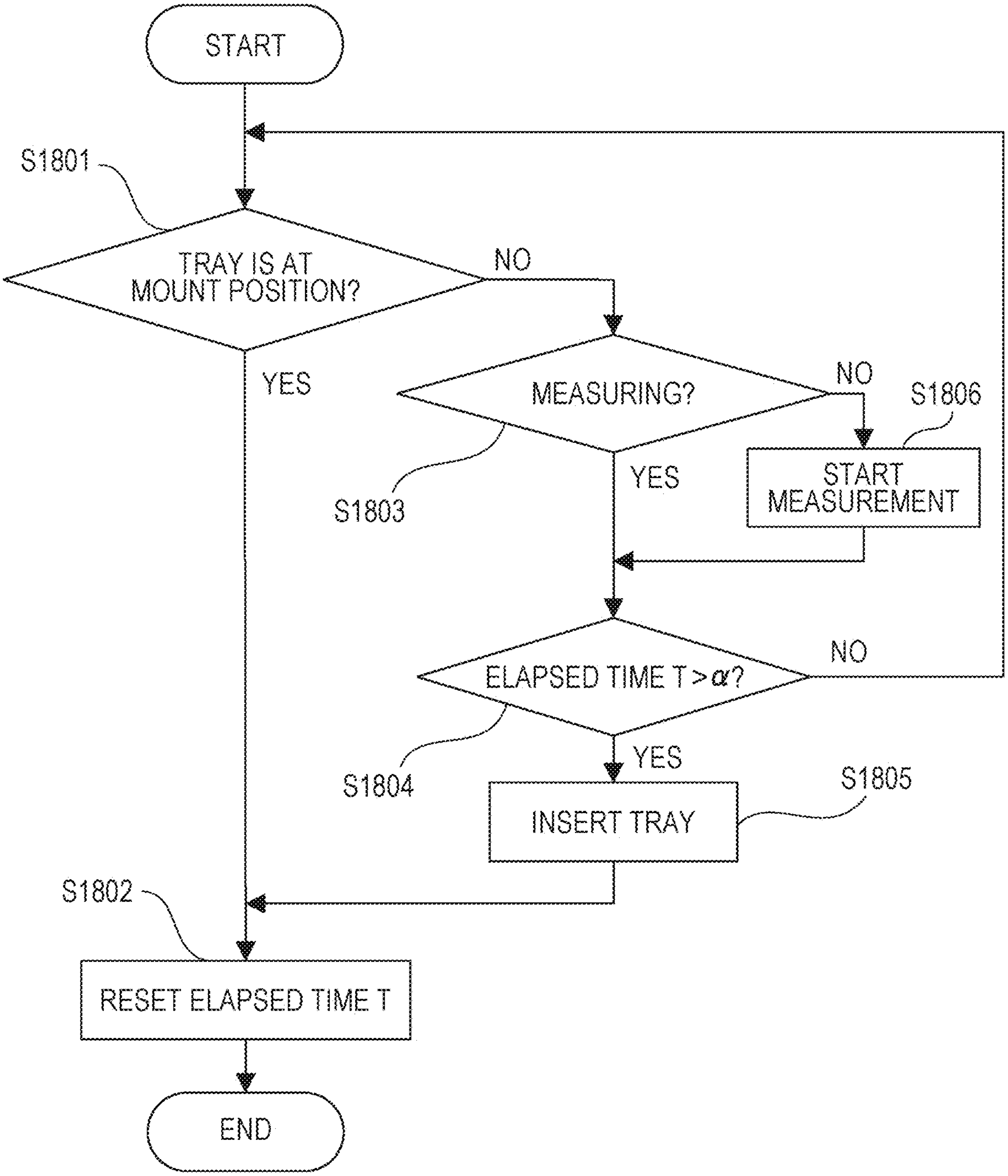
FIG. 18 is a flowchart illustrating control of an image forming apparatus according to the second embodiment.

Next, control according to the second embodiment will be described with reference to FIG. 18. FIG. 18 is a flowchart illustrating control according to the second embodiment.

The CPU 1422 confirms whether the tray 80 is at the mount position by the tray position detection part 1425 referring to the positional information of the tray 80 stored in the nonvolatile memory 1428 (S1801).

If the CPU 1422 determines that the tray 80 is at the mount position (S1801: YES), the elapsed time T is reset (S1802).

If the CPU 1422 determines that the tray is not at the mount position (S1801: NO), the CPU 1422 determines whether measurement of the elapsed time T has been started. If the elapsed time T has not been measured (S1803: NO), the tray position detection part 1425 starts measurement of the elapsed time T after confirming that the tray 80 is at the retraction position (S1806).

If measurement of the elapsed time T has been started (S1803: YES), whether the elapsed time T has exceeded the length of time α is confirmed (S1804). In the present embodiment, the length of time α is 10 seconds or more as one example. Setting the length of time as 10 seconds or more can suppress a possibility that the tray 80 moves during replacement of the toner cartridge 70 by a user.

If the elapsed time T is less than or equal to the length of time α (S1804: NO), the CPU 1422 performs the operation in S1801.

If the elapsed time T has exceeded the length of time α (S1804: YES), the tray insertion operation is performed (S1805).

The length of time for measurement of the elapsed time T described in the present embodiment is stored in the nonvolatile memory. However, it may be configured such that the length of time is freely set through the operation part 1410 by a user.

As described above, the engine control unit 1420 measures the elapsed time T from when the tray 80 is located at the retraction position to when the tray 80 reaches the mount position. When the tray 80 is located at the retraction position at a time when the elapsed time T exceeds a predetermined length of time, the engine control unit 1420 controls the movement of the tray 80 such that the tray 80 moves from the retraction position to the mount position. As a result, the tray 80 moves from the retraction position to the mount position, and the tray 80 reaches the mount position eventually.

Such a configuration can avoid a situation in which the tray 80 is located at the retraction position for a long time.

Third Embodiment

When the engine control unit 1420 receives a print instruction in a state in which the tray 80 is at the retraction position, the image forming apparatus 1 is not capable of performing printing. Thus, in a third embodiment, the tray 80 is moved from the retraction position to the mount position when the engine control unit 1420 receives a print instruction. Then, the image forming apparatus executes an image forming operation after the tray 80 reaches the mount position.

The image forming apparatus 1 in the third embodiment includes the same control system 1500 as that in the first embodiment, and description of the control system 1500 is thus omitted.

Figure 19:
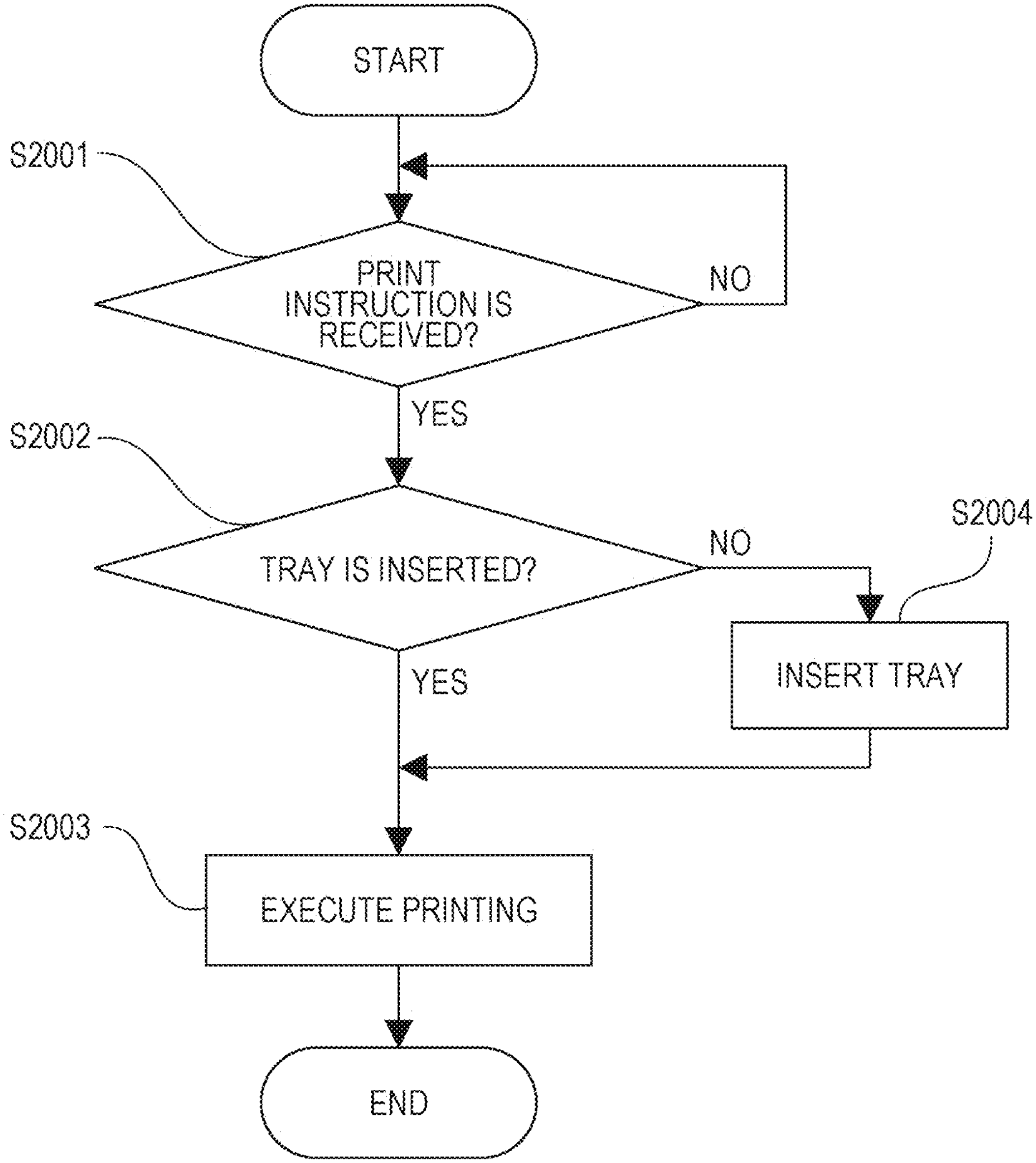
FIG. 19 is a flowchart illustrating control of an image forming apparatus according to a third embodiment.

Next, with reference to FIG. 19, control according to the third embodiment will be described. FIG. 19 is a flowchart illustrating control according to the third embodiment.

Upon receiving a print instruction from the controller 1400 via the video interface part 1421 (S2001: YES), the CPU 1422 confirms whether the tray 80 is located at the mount position by obtaining positional information of the tray detected by the tray position detection part 1425.

If the tray position detection part 1425 determines that the tray 80 is not inserted (S2002: NO), the CPU 1422 inserts the tray 80 by instructing the tray insertion/pulling-out control part 1424 to perform the tray insertion operation (S2004).

If determined that the tray 80 is at the mount position (S2002: YES), the CPU 1422 starts the image forming operation (S2003).

As described above, the engine control unit 1420 controls, upon receiving a print instruction, the image forming apparatus to perform an image forming operation. When the engine control unit 1420 receives a print instruction in a state in which the tray 80 is at the retraction position, the engine control unit 1420 moves the tray 80 from the retraction position to the mount position. Further, after the tray 80 reaches the mount position, the engine control unit 1420 controls the image forming apparatus to perform an image forming operation.

Such a configuration enables the image forming apparatus 1 to perform an image forming operation upon receiving a print instruction.

According to the present disclosure, it is possible to provide an image forming apparatus in a new form in which technologies in the related art have been developed.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-055650, filed Mar. 29, 2024, which is hereby incorporated by reference herein in its entirety.

What is claimed is:

1. An image forming apparatus configured such that a cartridge that stores a developer is attachable to and detachable from the image forming apparatus, the image forming apparatus comprising:

a rotary that is rotatable and that is configured to store the developer supplied from the cartridge;

a tray that removably supports the cartridge and that moves with respect to the rotary to a retraction position in which the cartridge is located outside the rotary and to a mount position in which the cartridge is located inside the rotary; and a control unit that controls a movement of the tray, wherein, in a case that an elapsed time since the tray is located at the retraction position exceeds a predetermined length of time, the control unit controls the movement of the tray such that the tray moves from the retraction position to the mount position.

2. The image forming apparatus according to claim 1, further comprising:

a sensor that detects a position of the tray; and a moving member whose position changes with the movement of the tray, the moving member being located at a first position when the tray is located at the mount position and being located at a second position when the tray is located at the retraction position, wherein an output of the sensor when the tray is located at the first position is different from an output of the sensor when the tray is located at the second position.

3. The image forming apparatus according to claim 1, further comprising:

a body frame that accommodates the rotary and that has an opening; and an opening-closing member that is provided to be movable between a close position and an open position with respect to the body frame, the close position being a position to cover the opening, the open position being a position to uncover the opening so that the tray is movable from the mount position to the retraction position through the opening, wherein the opening-closing member is configured to move from the close position to the open position in conjunction with the movement of the tray moving from the mount position to the retraction position, and wherein the opening-closing member is configured to move from the open position to the close position in conjunction with the movement of the tray moving from the retraction position to the mount position.

4. The image forming apparatus according to claim 1, further comprising:

a motor that drives the tray, wherein the control unit controls the movement of the tray by controlling the motor.

5. The image forming apparatus according to claim 1, wherein the predetermined length of time is 10 seconds or more.

6. An image forming apparatus configured such that a cartridge that stores a developer is attachable to and detachable from the image forming apparatus, the image forming apparatus comprising:

a rotary that is rotatable and that is configured to store the developer supplied from the cartridge;

a tray that removably supports the cartridge and that moves with respect to the rotary to a retraction position in which the cartridge is located outside the rotary and to a mount position in which the cartridge is located inside the rotary; and a control unit that controls a movement of the tray, wherein the control unit is capable of shifting a state of the image forming apparatus to a standby state in which an image forming operation is capable of being started and a sleep state in which power consumption is less than in the standby state, wherein, upon receiving a sleep instruction, the control unit shifts the image forming apparatus to the sleep state, and wherein, when the control unit receives the sleep instruction in a state in which the tray is located at the retraction position, the control unit moves the tray from the retraction position to the mount position.

7. The image forming apparatus according to claim 6, further comprising:

a sensor that detects a position of the tray; and a moving member whose position changes with the movement of the tray, the moving member being located at a first position when the tray is located at the mount position and being located at a second position when the tray is located at the retraction position, wherein an output of the sensor when the tray is located at the first position is different from an output of the sensor when the tray is located at the second position.

8. The image forming apparatus according to claim 6, further comprising:

a body frame that accommodates the rotary and that has an opening; and an opening-closing member that is provided to be movable between a close position and an open position with respect to the body frame, the close position being a position to cover the opening, the open position being a position to uncover the opening so that the tray is movable from the mount position to the retraction position through the opening, wherein the opening-closing member is configured to move from the close position to the open position in conjunction with the movement of the tray moving from the mount position to the retraction position, and wherein the opening-closing member is configured to move from the open position to the close position in conjunction with the movement of the tray moving from the retraction position to the mount position.

9. The image forming apparatus according to claim 6, further comprising:

a motor that drives the tray, wherein the control unit controls the movement of the tray by controlling the motor.

10. An image forming apparatus configured such that a cartridge that stores a developer is attachable to and detachable from the image forming apparatus, the image forming apparatus comprising:

a rotary that is rotatable and that is configured to store the developer supplied from the cartridge;

a tray that removably supports the cartridge and that moves with respect to the rotary to a retraction position in which the cartridge is located outside the rotary and to a mount position in which the cartridge is located inside the rotary; and a control unit that controls a movement of the tray, wherein, upon receiving a print instruction, the control unit controls the image forming apparatus to perform an image forming operation, and wherein, when the control unit receives the print instruction in a state in which the tray is located at the retraction position, the control unit moves the tray from the retraction position to the mount position.

11. The image forming apparatus according to claim 10, further comprising:

a sensor that detects a position of the tray; and a moving member whose position changes with the movement of the tray, the moving member being located at a first position when the tray is located at the mount position and being located at a second position when the tray is located at the retraction position, wherein an output of the sensor when the tray is located at the first position is different from an output of the sensor when the tray is located at the second position.

12. The image forming apparatus according to claim 10, further comprising:

a body frame that accommodates the rotary and that has an opening; and an opening-closing member that is provided to be movable between a close position and an open position with respect to the body frame, the close position being a position to cover the opening, the open position being a position to uncover the opening so that the tray is movable from the mount position to the retraction position through the opening, wherein the opening-closing member is configured to move from the close position to the open position in conjunction with the movement of the tray moving from the mount position to the retraction position, and wherein the opening-closing member is configured to move from the open position to the close position in conjunction with the movement of the tray moving from the retraction position to the mount position.

13. The image forming apparatus according to claim 10, further comprising:

a motor that drives the tray, wherein the control unit controls the movement of the tray by controlling the motor.

* * * * *